(12) United States Patent
Yasuda et al.

(10) Patent No.: US 11,297,269 B2
(45) Date of Patent: Apr. 5, 2022

(54) IMAGE CAPTURING APPARATUS

(71) Applicant: CANON KABUSHIKI KAISHA, Tokyo (JP)

(72) Inventors: Takayuki Yasuda, Yokohama (JP); Hiroyasu Katagawa, Yokohama (JP); Tomonaga Iwahara, Atsugi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/778,475

(22) Filed: Jan. 31, 2020

(65) Prior Publication Data
US 2020/0252563 A1 Aug. 6, 2020

(30) Foreign Application Priority Data
Feb. 4, 2019 (JP) .............................. JP2019-018255

(51) Int. Cl.
| | |
|---|---|
| *H04N 5/369* | (2011.01) |
| *H04N 5/343* | (2011.01) |
| *H04N 5/374* | (2011.01) |
| *H04N 5/378* | (2011.01) |
| *H04N 5/335* | (2011.01) |
| *H04N 5/347* | (2011.01) |
| *H01L 27/146* | (2006.01) |
| *G01J 1/44* | (2006.01) |
| *H03M 1/24* | (2006.01) |
| *H04N 5/3745* | (2011.01) |

(52) U.S. Cl.
CPC ......... *H04N 5/36961* (2018.08); *H04N 5/343* (2013.01); *H04N 5/37457* (2013.01)

(58) Field of Classification Search
CPC ............... H04N 5/36961; H04N 5/343; H04N 5/37457; H04N 5/37455; H04N 5/378; H04N 5/3355; H04N 5/23229; H04N 5/347; H03M 1/54; H01L 27/14609; H01L 31/107; H01L 27/14634; H01L 27/14643; H01L 31/02027; H01L 27/146; H01L 27/1461; G01J 1/44; G01J 2001/4466
USPC ....... 348/302, 308, 254, 345, 349, 138, 326, 348/285, 312, 536, 537, 676; 377/44, 43, 377/47, 61, 78, 80, 79, 104, 106; 341/100, 101, 159; 250/208.1, 214.1, 250/214 R; 396/79, 80, 82, 240, 553; 257/186, 199, 322, 438, 481, 492, 493, 257/551, 589
See application file for complete search history.

(56) References Cited

U.S. PATENT DOCUMENTS

| | | | | |
|---|---|---|---|---|
| 10,419,003 B1 * | 9/2019 | Kim | ................... | H03K 23/005 |
| 11,115,612 B2 * | 9/2021 | Kobayashi | .......... | H04N 5/3765 |

(Continued)

FOREIGN PATENT DOCUMENTS

| | | |
|---|---|---|
| JP | 2008-134389 A | 6/2008 |
| JP | 2013-106194 A | 5/2013 |
| JP | 2015-173432 A | 10/2015 |

*Primary Examiner* — Marly S Camargo
(74) *Attorney, Agent, or Firm* — Cowan, Liebowitz & Latman, P.C.

(57) ABSTRACT

An image capturing apparatus includes an image sensor in which a plurality of unit pixels are arranged, each unit pixel including one microlens and at least one light receiving portion that produces a pulse signal when light is incident on the light receiving portion, wherein the unit pixel includes a counting circuit capable of counting the pulse signals of a plurality of the light receiving portions.

8 Claims, 27 Drawing Sheets

(56) References Cited

U.S. PATENT DOCUMENTS

| | | | |
|---|---|---|---|
| 2009/0109315 A1* | 4/2009 | Taura | H04N 3/14 348/294 |
| 2013/0321683 A1* | 12/2013 | Sonoda | H04N 5/378 348/302 |
| 2015/0028190 A1* | 1/2015 | Shin | H03M 1/14 250/208.1 |
| 2015/0335609 A1* | 11/2015 | Balasubramanian et al. | H04N 5/347 348/302 |
| 2016/0344920 A1* | 11/2016 | Iwahara | H04N 5/23212 348/308 |
| 2017/0121173 A1* | 5/2017 | Andreou | G01J 1/44 |
| 2019/0014281 A1* | 1/2019 | Kobayashi | H04N 5/378 |
| 2020/0045251 A1* | 2/2020 | Koizumi | H04N 5/351 |
| 2021/0123802 A1* | 4/2021 | Ryoki | G01J 1/0228 |
| 2021/0124047 A1* | 4/2021 | Egawa | G01S 17/894 |

* cited by examiner

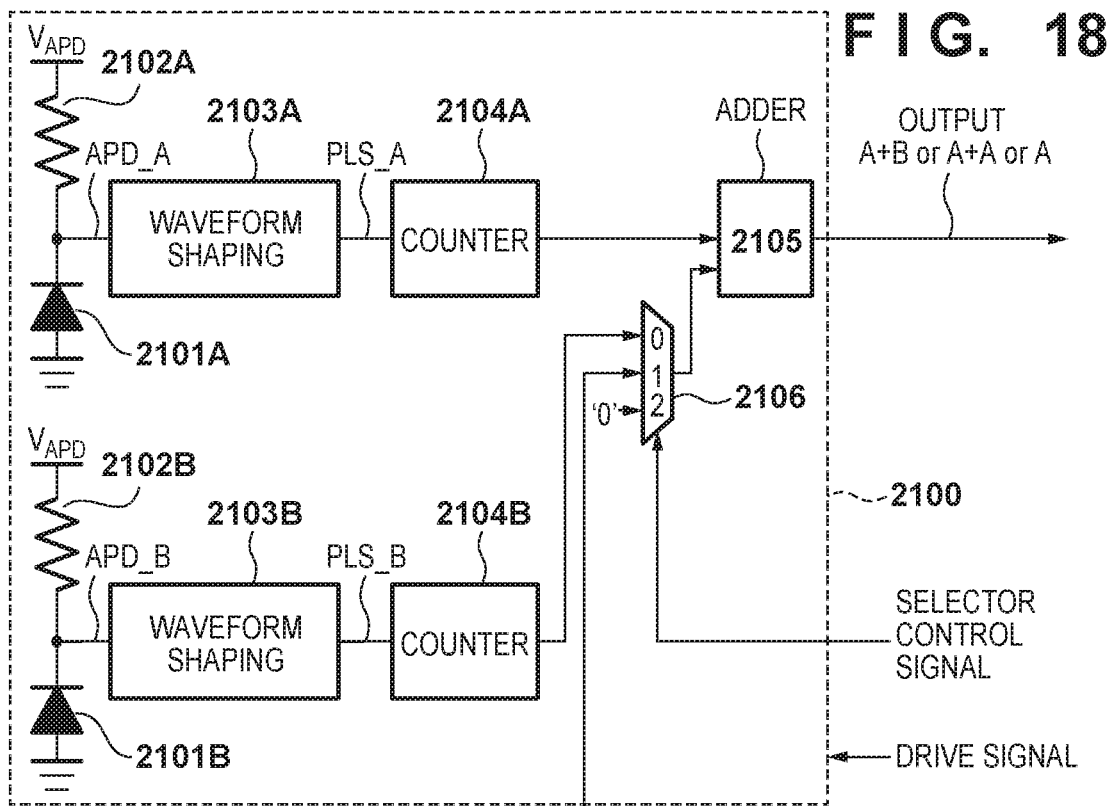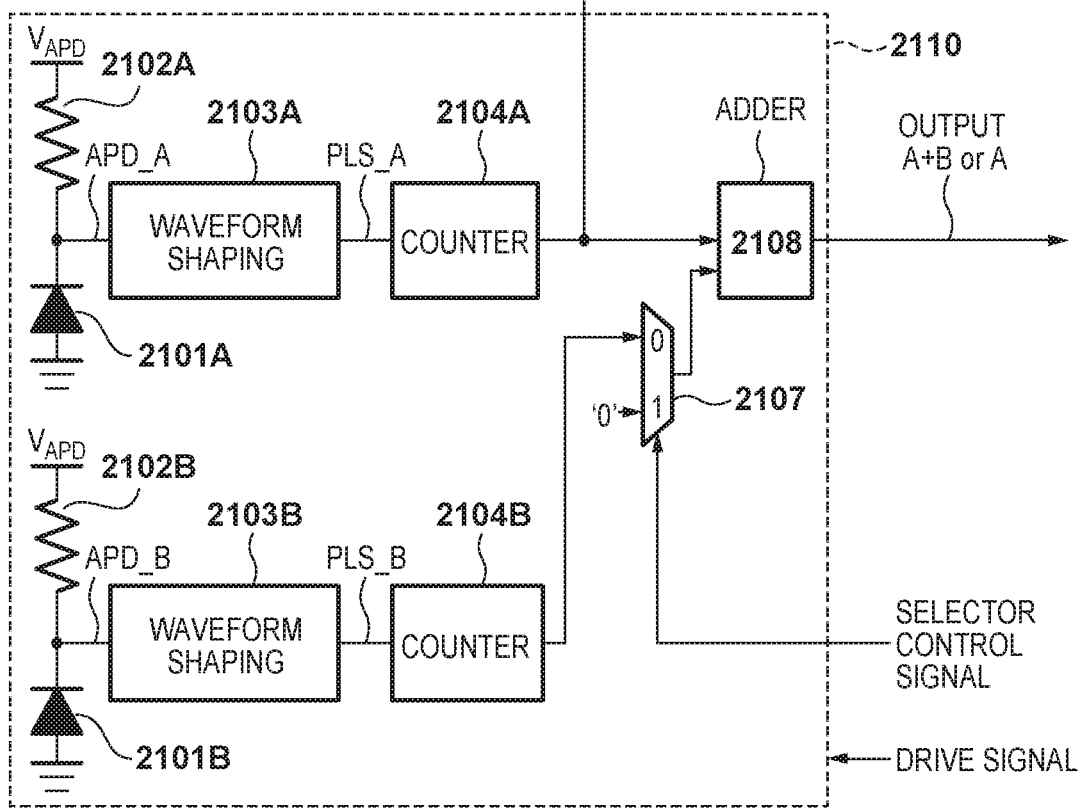

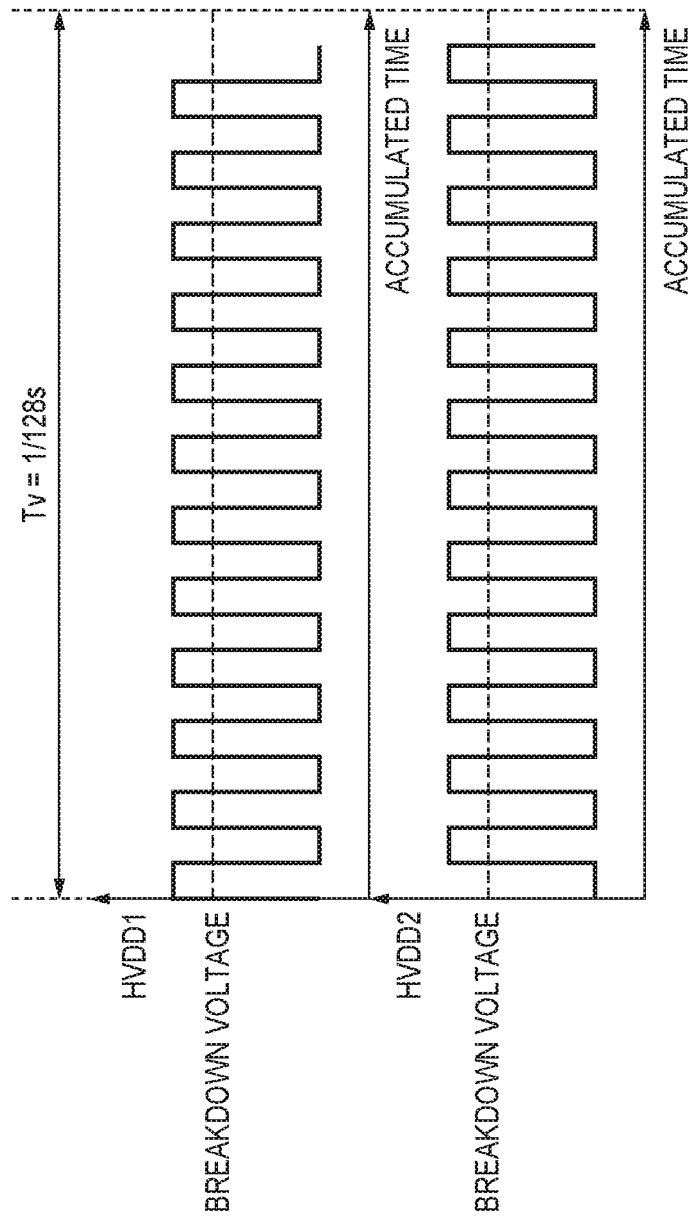

IMAGE CAPTURING APPARATUS

BACKGROUND OF THE INVENTION

Field of the Invention

The present invention relates to a technique for adding signals from light-receiving elements in an image capturing apparatus.

Description of the Related Art

As one conventional autofocus (AF) method used in an image capturing apparatus, a technique is known in which pupil-division images are obtained using an image sensor having a plurality of photoelectric conversion portions for each of microlenses, and focus detection is carried out by finding a phase difference between two of the obtained pupil-division images.

For example, Japanese Patent Laid-Open No. 2008-134389 discloses carrying out focus detection by finding a phase difference from pupil-divided images, and at the same time, adding all the pixels corresponding to a single microlens together and handling the result as a single pixel. Through this, signals providing the same effect as a conventional image sensor arrangement are obtained, and an image for observation is created using a conventional signal processing technique.

Furthermore, as a signal readout method for such an image sensor, Japanese Patent Laid-Open No. 2013-106194 discloses carrying out a first operation of reading out a first pixel signal from two pixels in a pupil-divided photodiode, and carrying out a second operation of adding a second pixel signal, without resetting, and reading out the result. The second pixel signal is then found by subtracting the first pixel signal from the added signal. This document also discloses the ability to transfer the minimum required amount of data by reading out both the first pixel signal and the second pixel signal only in a designated focus detection region, and reading out only the second pixel signal in other regions. The technique can therefore respond to demands for improved performance, such as higher resolutions, faster continuous shooting, and higher moving image framerates.

Incidentally, Japanese Patent Laid-Open No. 2015-173432 proposes a solid-state image sensor having a 1-bit AD converter and a counter for each pixel. Signals from light-receiving elements are AD-converted on a pixel-by-pixel basis, which makes it possible to eliminate the tradeoff between the framerate and the number of scanning lines in a solid-state image sensor which AD-converts on a column-by-column basis.

However, problems such as the following arise with the conventional techniques disclosed in the documents mentioned above.

Consider a case where, in an image capturing apparatus having 1-bit AD converters and counters, both the count value of the first pixel signal and the count value of the second pixel signal are read out only for a designated focus detection region, as disclosed in Japanese Patent Laid-Open No. 2013-106194. In this case, providing a counter for the first pixel signal and a counter for the second pixel signal in regions aside from the designated focus detection region as well will increase the scale of the circuit. Furthermore, driving the counter for the first pixel signal and the counter for the second pixel signal in regions aside from the designated focus detection region will increase the amount of power consumed.

SUMMARY OF THE INVENTION

Having been achieved in light of the above-described problems, the present invention suppresses an increase in the circuit scale and power consumption of an image capturing apparatus having a 1-bit AD converter and a counter for each of pixels.

According to a first aspect of the present invention, there is provided an image capturing apparatus comprising an image sensor in which a plurality of unit pixels are arranged, each unit pixel including one microlens and at least one light receiving portion that produces a pulse signal when light is incident on the light receiving portion, wherein the unit pixel includes a counting circuit capable of counting the pulse signals of a plurality of the light receiving portions.

Further features of the present invention will become apparent from the following description of exemplary embodiments with reference to the attached drawings.

BRIEF DESCRIPTION OF THE DRAWINGS

FIG. 18 is a diagram illustrating the configuration of a unit pixel according to a fourth embodiment.

FIG. 37 is a diagram illustrating an example of voltage driving according to a tenth embodiment.

DESCRIPTION OF THE EMBODIMENTS

Figure 1:
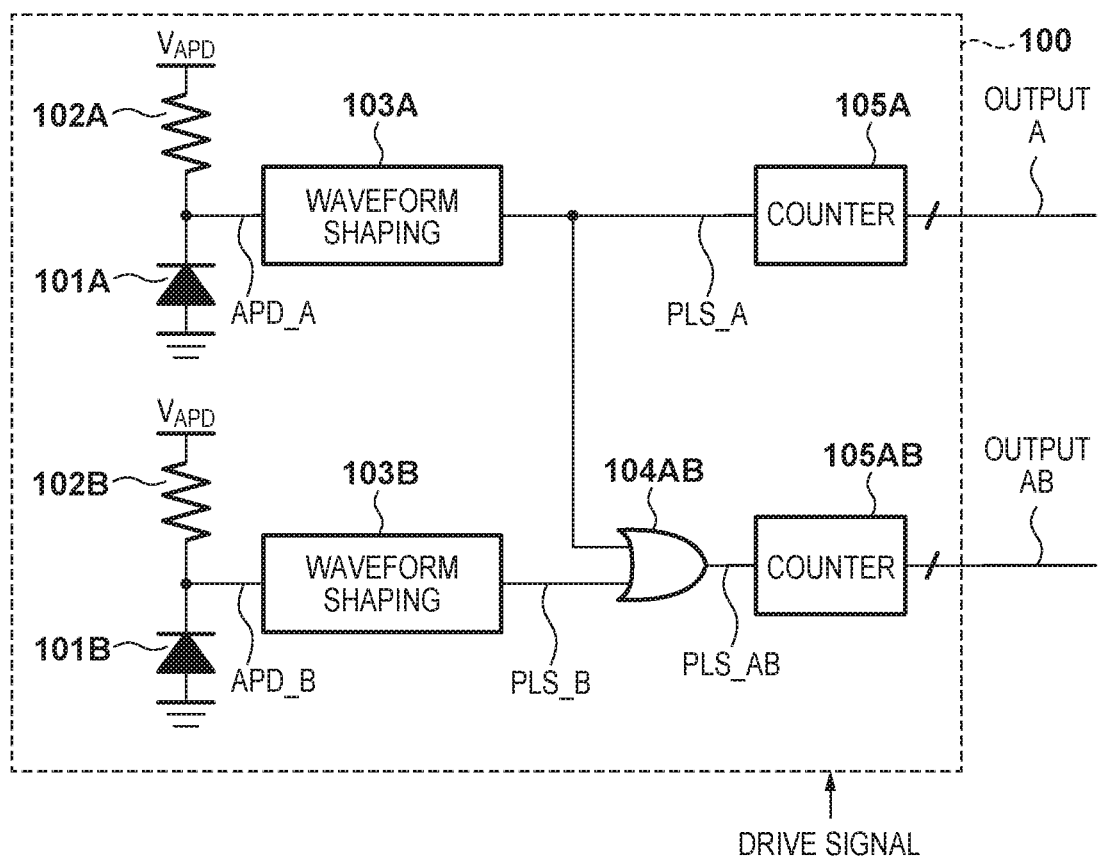
FIG. 1 is a diagram illustrating the configuration of a unit pixel in an image capturing apparatus according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a circuit diagram illustrating the configuration of a unit pixel 100 in an image capturing apparatus according to a first embodiment of the present invention. The configuration of the unit pixel 100, which is a constituent element of a solid-state image sensor, will be described with reference to FIG. 1.

A plurality of the unit pixels 100 are arranged in the solid-state image sensor, and each unit pixel 100 includes avalanche photodiodes ("APDs" hereinafter) 101A and 101B, quenching resistors 102A and 102B, waveform shaping circuits 103A and 103B, an OR circuit 104AB, and counters 105A and 105AB.

In each unit pixel 100, two APDs 101 are provided as light-receiving elements for a single microlens. Although this will be described in more detail later, a signal can be obtained from one of two different regions of an exit pupil by the counter 105A counting the number of photons received by the APD 101A through the microlens.

Additionally, signals for display and recording can be obtained (i.e., an image can be generated) by the counter 105AB counting the numbers of photons received by the APD 101A and the APD 101B. Furthermore, a signal can be obtained from the other of the two different regions of the exit pupil by a circuit in a later stage subtracting the count value of the counter 105A from the count value of the counter 105AB.

Each of the constituent elements in the unit pixel will be described in detail next. The APDs 101A and 101B are connected to a reverse-bias voltage VAPD through the quenching resistors 102A and 102B, and each produces a charge through avalanche amplification when a photon is incident thereon. The charges are discharged through the quenching resistors 102A and 102B. The waveform shaping circuits 103A and 103B generate voltage pulses (pulse signals) by amplifying and detecting edges in the changes of potentials resulting from the generation and discharge of charges based on incident photons. Thus the APDs 101, the quenching resistors 102, and the waveform shaping circuits 103 function as a 1-bit AD converter by converting whether or not a photon is incident into a voltage pulse.

The output from the waveform shaping circuit 103A is input to the counter 105A as PLS_A. The output from the waveform shaping circuit 103A, i.e., PLS_A, and the output from the waveform shaping circuit 103B, i.e., PLS_B, are input to the counter 105AB, via the OR circuit 104AB, as PLS_AB.

According to this configuration, the counter 105A can obtain a signal from one of the different regions of the exit pupil. The counter 105AB can obtain an image for display and recording by adding both signals from the different regions of the exit pupil.

Here, to simplify the subsequent descriptions, the waveform generated by the APD 101A and the quenching resistor 102A will be represented by APD_A, and the waveform generated by the APD 101B and the quenching resistor 102B will be represented by APD_B. The output of the waveform shaping circuit 103A will be represented by PLS_A, and the output of the OR circuit 104AB will be represented by PLS_AB.

A method for driving focus detection lines 201 and non-focus detection lines 202 in the unit pixel 100 will be described next with reference to FIGS. 2, 3A, and 3B.

Figure 2:
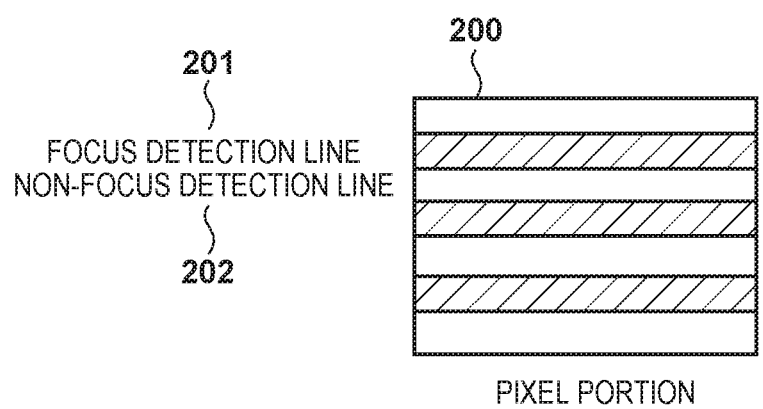
FIG. 2 is a diagram illustrating a pixel portion according to the first embodiment of the present invention.

FIG. 2 is a diagram illustrating a pixel portion 200 in the image sensor, in which many of the unit pixels 100 are arranged in a matrix, and indicates the focus detection lines 201 and the non-focus detection lines 202. FIG. 3A is a timing chart illustrating the driving of the unit pixels 100 in the focus detection lines 201.

Figure 3A:
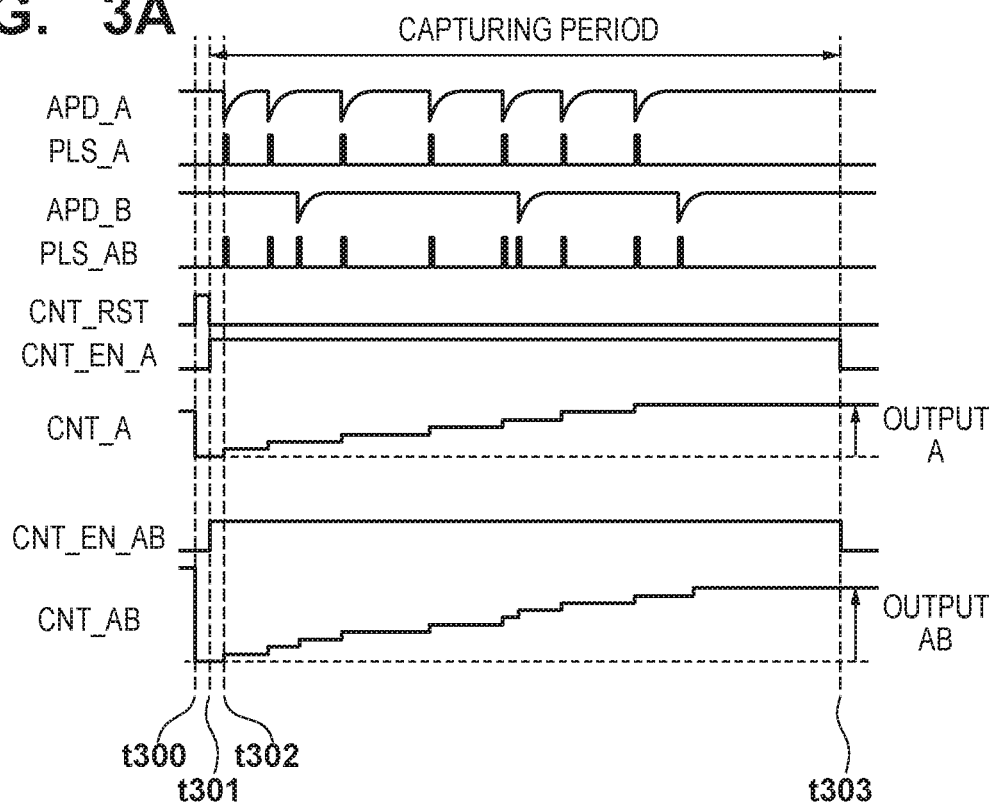
FIG. 3A is a timing chart illustrating operations carried out by unit pixels in focus detection lines according to the first embodiment.

FIG. 3A indicates driving for image capturing in a single unit pixel 100, and an optical image is converted into a digital signal by carrying out this driving in parallel for a plurality of the unit pixels 100. In the drawing, CNT_RST, CNT_EN_A, and CNT_EN_AB represent drive signals, which control the counters 105A and 105AB.

The count values of the counters 105A and 105AB are reset to 0 as a result of CNT_RST going to high level ("H", hereinafter). The counter 105A counts a pulse number only during the period when CNT_EN_A is "H". The counter 105AB counts a pulse number only during the period when CNT_EN_AB is "H". CNT_A and CNT_AB represent the count values of the counters 105A and 105AB. In FIG. 3A, CNT_A expresses a count value in eight levels, from 0 to 7, for the sake of simplicity. CNT_AB is controlled by PLS_AB, which is obtained by PLS_A and PLS_B being added by the OR circuit 104AB, and therefore expresses a count value in 16 levels, from 0 to 15, for double that of CNT_A.

The driving of the unit pixel 100 will be described next with reference to the timings. At timing t300, CNT_RST goes to "H", and the count values of the counters 105A and 105AB are reset to 0.

At timing t301, CNT_RST goes to Low level ("L", hereinafter), and the resetting of the counters 105A and 105AB ends. At the same time, CNT_EN_A and CNT_EN_AB go to "H", which activates the counting of voltage pulses by the counters 105A and 105AB. An image capturing period, which is a period in which voltage pulses produced by photons being incident on the APDs 101A and 101B are counted, is started as a result.

At timing t302, a photon is incident on the APD 101A, which produces an avalanche-amplified charge and causes the potential of APD_A to change. The charge is discharged through the quenching resistor 102A, and it therefore takes some time for APD_A to return to a constant potential. The waveform shaping circuit 103A detects the falling edge of APD_A and generates a short voltage pulse. This voltage pulse is input to the counter 105A, as well as to the counter 105AB via the OR circuit 104AB, and the count values of the counter 105A and the counter 105AB become 1.

From timing t302 to t303, the voltage pulses generated by the waveform shaping circuit 103A are counted by the counter 105A and the counter 105AB, and the voltage pulses generated by the waveform shaping circuit 103B are counted by the counter 105AB.

At timing t303, CNT_EN_A and CNT_EN_AB go to "L", and the image capturing period ends. At the end of this period, the count values of the counters 105A and 105AB are output to the exterior of the unit pixel 100 as an output A and an output AB, respectively. By carrying out the driving as illustrated in FIG. 3A, the numbers of photons incident on the APDs 101A and 101B within the image capturing period are counted. As a result, the counter 105A can obtain a signal from one of the different regions of the exit pupil. Furthermore, by counting with the counter 105AB, signals can be obtained from both of the different regions of the exit pupil, which makes it possible to obtain signals for display and recording.

Figure 3B:
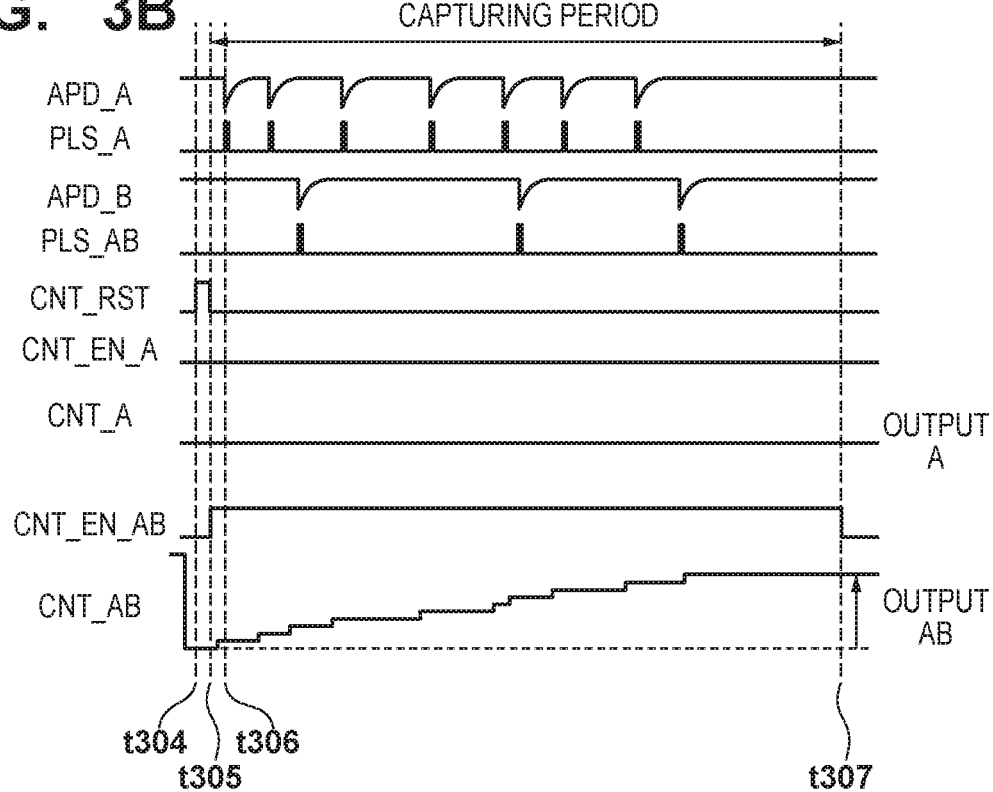
FIG. 3B is a timing chart illustrating operations carried out by unit pixels in non-focus detection lines according to the first embodiment.

FIG. 3B is a timing chart illustrating the driving of the unit pixels 100 in the non-focus detection lines 202. FIG. 3B indicates driving for image capturing in a single unit pixel 100, and an optical image is converted into a digital signal by carrying out this driving in parallel for a plurality of the unit pixels 100.

At timing t304, CNT_RST goes to "H", and the count value of the counter 105AB is reset to 0. As will be described later, in the non-focus detection lines, there is no need to count the counters A in the unit pixels 100. Thus to reduce the power consumed, the clock is turned off by using clock gating or the like to hold the values at "0" in the counter A, regardless of whether or not CNT_RST goes to "H".

At timing t305, CNT_RST goes to "L", and the resetting of the counter 105AB ends. Here, CNT_EN_A remains at "L" even after the counter is reset, and the counting operations of the counter 105A remain inactive by using clock gating or the like in order to reduce the power consumed. On the other hand, CNT_EN_AB goes to "H", which activates the counting of voltage pulses by the counter 105AB. The image capturing period, which is the period in which voltage pulses produced by photons being incident on the APDs 101A and 101B are counted, is started as a result.

At timing t306, a photon is incident on the APD 101A, which produces an avalanche-amplified charge and causes the potential of APD_A to change. The charge is discharged through the quenching resistor 102A, and it therefore takes some time for APD_A to return to a constant potential. The waveform shaping circuit 103A detects the falling edge of APD_A and generates a short voltage pulse. This voltage pulse is input to the counter 105A, as well as to the counter 105AB via the OR circuit 104AB, and the count value of the counter 105AB becomes 1. The counting operations of the counter 105A remain inactive by using clock gating or the like to reduce the power consumed, and the count therefore does not increase.

From timing t306 to t307, the voltage pulses generated by the waveform shaping circuit 103A and the waveform shaping circuit 103B are counted by the counter 105AB. At timing t307, CNT_EN_AB goes to "L", and the image capturing period ends. At the end of this period, the count value of the counter 105AB is output to the exterior of the unit pixel 100 as the output AB.

By carrying out the driving as illustrated in FIG. 3B, the numbers of photons incident on the APDs 101A and 101B within the image capturing period are counted. On the other hand, the counter 105A does not operate, by using clock gating or the like. This makes it possible to achieve a reduction in the power consumed. Also, a signal for display and recording can be obtained by counting using the counter 105AB.

Figure 4:
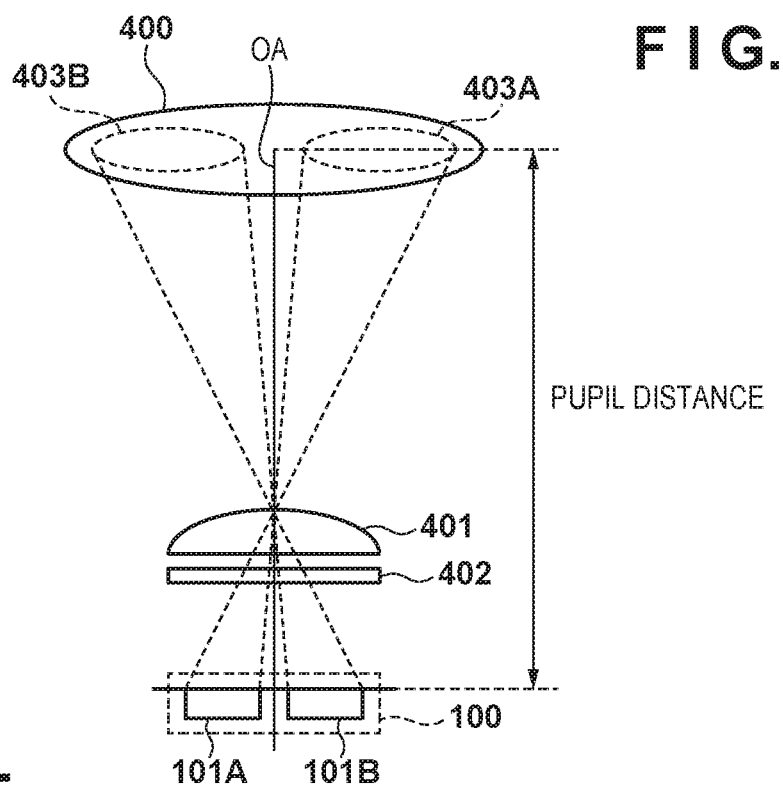
FIG. 4 is a diagram illustrating the principles of pupil-division focus detection according to the first embodiment.

The principles of pupil-division focus detection according to the present embodiment will be described next with reference to FIG. 4. FIG. 4 is a conceptual diagram illustrating light beams exiting from an exit pupil of a shooting lens and being incident on a unit pixel. As described earlier, the APD 101A and the APD 101B are arranged in the unit pixel 100.

As illustrated in FIG. 4, a light beam exiting from an exit pupil 400 passes through a microlens 401 and a color filter 402, and is incident on the unit pixel 100, central to an optical axis OA. The distance from the exit pupil 400 to the unit pixel 100 will be called a "pupil distance". The light beams passing through a pupil region 403A and a pupil region 403B, which indicate partial regions of the exit pupil 400, are incident on the APD 101A and the APD 101B, respectively. As such, the APD 101A and the APD 101B receive light from different regions of the exit pupil in the shooting lens. A phase difference can be detected by comparing the signal from the APD 101A with the signal from the APD 101B.

Figure 5:
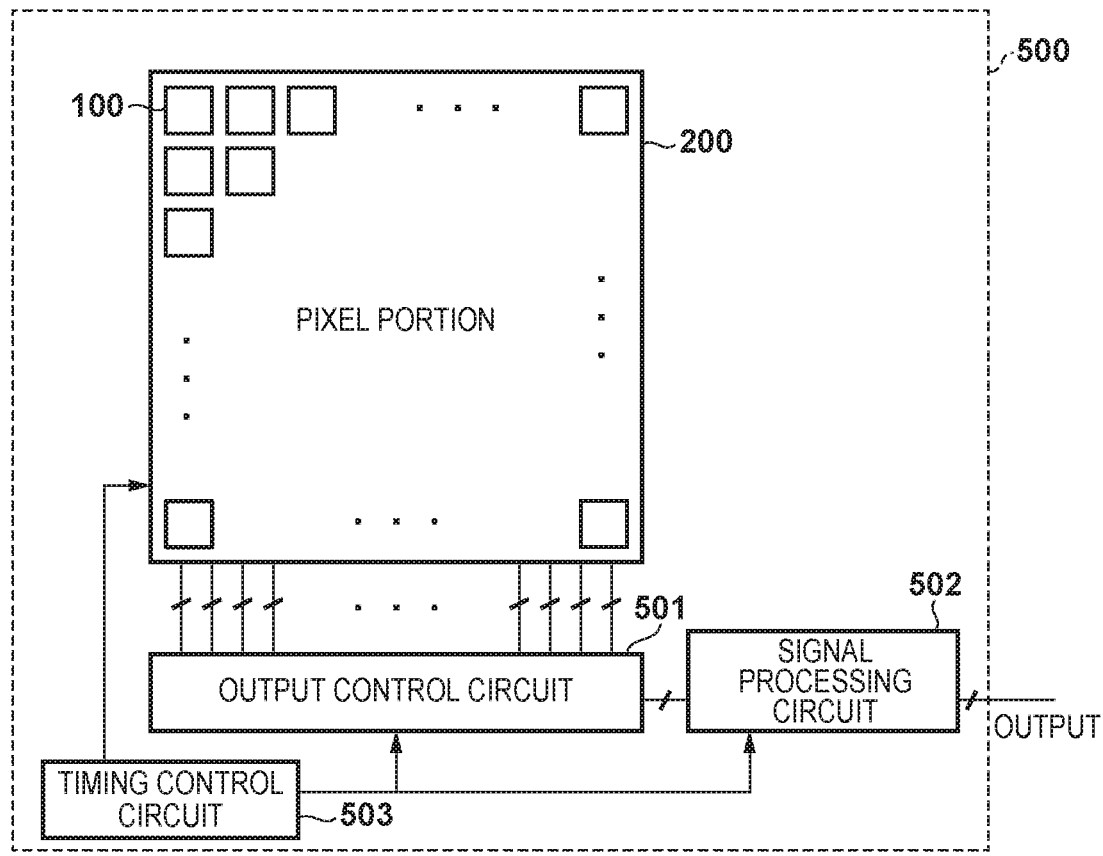
FIG. 5 is a diagram illustrating the configuration of a solid-state image sensor according to the first embodiment.

Next, the configuration of a solid-state image sensor according to the present embodiment will be described using FIG. 5. FIG. 5 is a circuit diagram illustrating the configuration of a solid-state image sensor 500.

The solid-state image sensor 500 is configured including the pixel portion 200, in which many of the unit pixels 100 are arranged in a matrix, as well as an output control circuit 501, a signal processing circuit 502, and a timing control circuit 503.

The output A and the output AB from each unit pixel 100 arranged in the pixel portion 200 are input to the output control circuit 501, and the signals of the unit pixels 100 to be output to the signal processing circuit 502 are selected and controlled. For the focus detection lines 201, the signal processing circuit 502 outputs the output A and the output AB from each unit pixel 100 to the exterior of the solid-state image sensor 500. For the non-focus detection lines 202, the counter 105A does not operate, by using clock gating or the like, and thus only the output AB is output to the exterior of the solid-state image sensor 500.

The timing control circuit 503 outputs drive signals to the pixel portion 200, and also controls the driving timings of the output control circuit 501 and the signal processing circuit 502. Carrying out such driving for the counter 105A makes it possible to reduce the power consumed.

Figure 6:
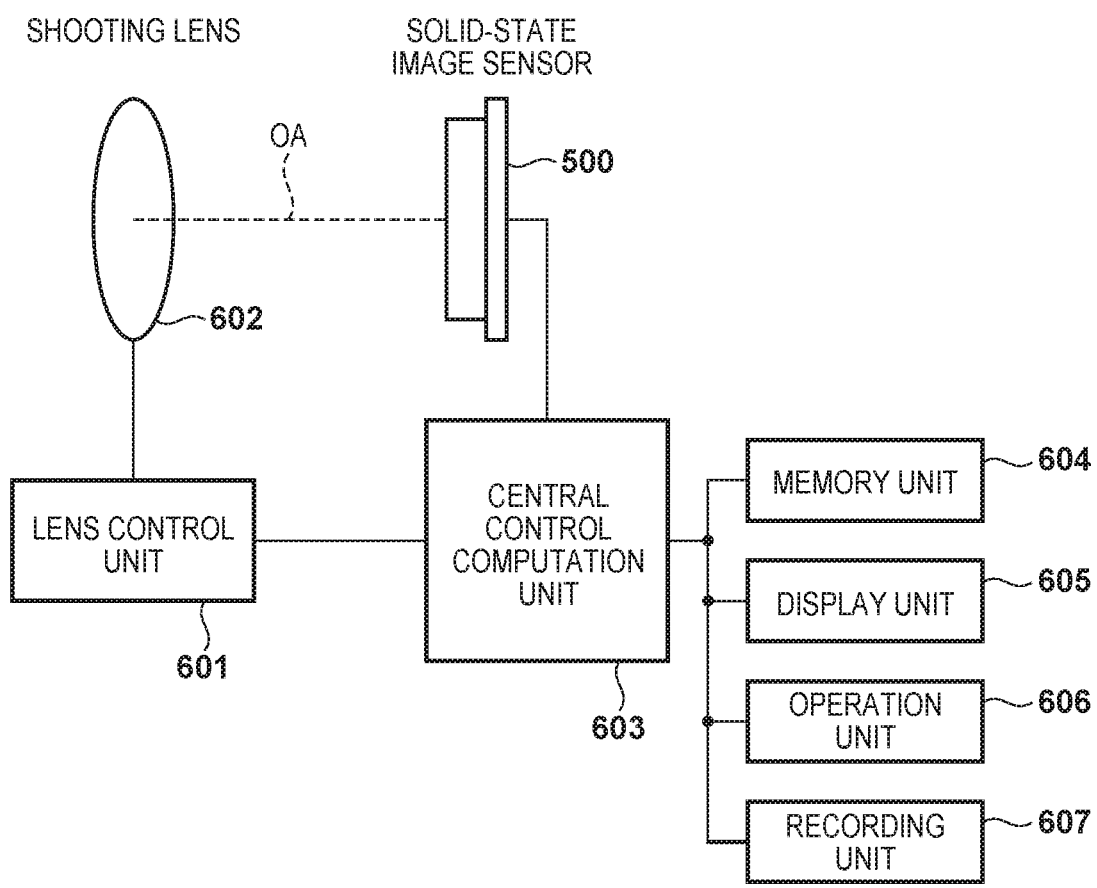
FIG. 6 is a diagram illustrating the configuration of an image capturing apparatus according to the first embodiment.

The configuration of an image capturing apparatus using the solid-state image sensor 500 will be described next with reference to FIG. 6.

The solid-state image sensor 500 converts an optical image formed by a shooting lens 602 into an electrical signal. A lens control unit 601 carries out focus driving and aperture driving for the shooting lens 602 in response to instructions from a central control computation unit 603.

The central control computation unit 603 controls the image capturing apparatus as a whole, including controlling the solid-state image sensor 500, and correcting and developing signals output from the solid-state image sensor 500. The central control computation unit 603 furthermore determines whether to drive the pixel portion 200 in the solid-state image sensor 500 as the focus detection lines 201, or as the non-focus detection lines 202 for reducing the power consumed.

The central control computation unit 603 detects a phase difference on the basis of the signals of the outputs A from a plurality of the unit pixels 100 driven as the focus detection lines 201, and signals obtained by subtracting the outputs A from the outputs AB. A focus driving control amount is then communicated to the lens control unit 601 on the basis of the detection result.

Image data is temporarily stored in a memory unit 604, and various types of information, shot images, and the like are displayed in a display unit 605. An operation unit 606 includes various types of interfaces for the image capturing apparatus, and the central control computation unit 603 controls the various blocks using signals from the operation unit 606. A recording unit 607 is a removable recording unit, such as semiconductor memory or the like, for recording and reading out image data.

In this manner, for the focus detection lines 201, the counters 105A and the counters 105AB in the unit pixels 100 within the pixel portion 200 are driven to obtain the pixel values required for focus detection. On the other hand, for the non-focus detection lines 202, the counters 105A are not driven by using clock gating or the like, which makes it possible to reduce the power consumed.

Second Embodiment

An image capturing apparatus and a driving method thereof according to a second embodiment of the present invention will be described next. In the following, constituent elements that are the same as those in the first embodiment will be given the same symbols and reference signs, and will not be described.

Figure 7:
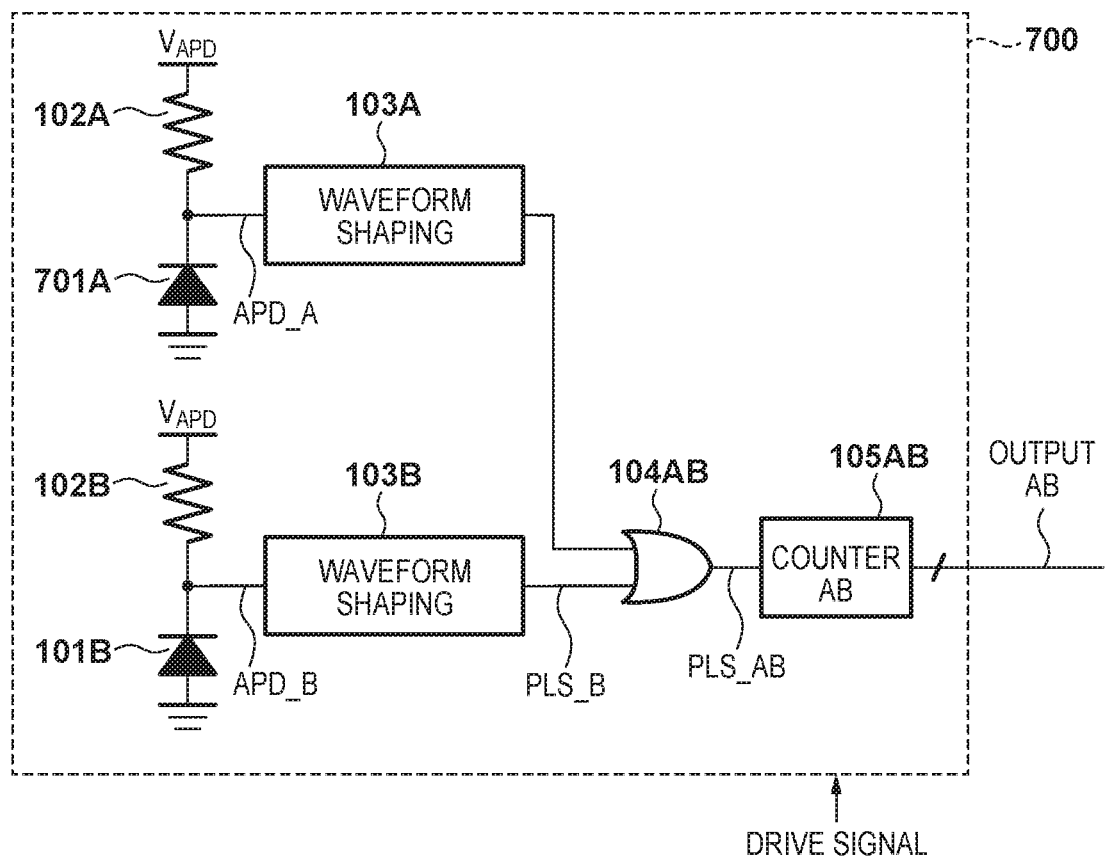
FIG. 7 is a diagram illustrating the configuration of a unit pixel in an image capturing apparatus according to a second embodiment.

The configuration of a unit pixel 700, which is a constituent element of a solid-state image sensor according to the present embodiment, will be described with reference to FIG. 7. FIG. 7 is a circuit diagram illustrating the configuration of the unit pixel 700 according to the second embodiment.

The unit pixel 700 indicates the configuration of pixels in non-focus detection lines 802 of the pixel portion 200. Pixels having the configuration of the unit pixel 100, illustrated in FIG. 1, are arranged for focus detection lines 201 of the pixel portion 200.

Each unit pixel 700 is configured including the avalanche photodiodes ("APDs" hereinafter) 101A and 101B, the quenching resistors 102A and 102B, the waveform shaping circuits 103A and 103B, the OR circuit 104AB, and the counter 105AB. The unit pixel 700 is not provided with the counter 105A as in the unit pixel 100, and thus cannot be used as a pixel for focus detection, but this enables a configuration with a smaller circuit scale.

A method for driving focus detection lines 201 and non-focus detection lines 802 (see FIG. 8) in the unit pixel 700 will be described next with reference to FIGS. 8, 3A, and 9.

Figure 8:
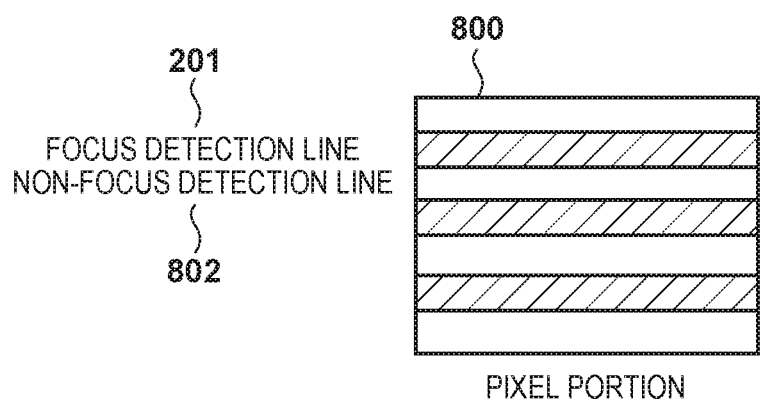
FIG. 8 is a diagram illustrating a pixel portion according to the second embodiment.

FIG. 8 illustrates the unit pixel 700, and a pixel portion 800 in which many of the unit pixels 700 are arranged in a matrix, and furthermore illustrates that the focus detection lines 201 are constituted by the unit pixels 100, and that the non-focus detection lines 802 are constituted by the unit pixels 700.

FIG. 3A is, as in the first embodiment, a timing chart illustrating the driving of the unit pixels 100 in the focus detection lines 201. FIG. 9 is a timing chart illustrating the driving of the unit pixels 700 in the non-focus detection lines 802. FIG. 9 indicates driving for image capturing in a single unit pixel 700, and an optical image is converted into a digital signal by carrying out this driving in parallel for a plurality of the unit pixels 700.

At timing t900, CNT_RST goes to "H", and the count value of the counter 105AB is reset to 0.

At timing t901, CNT_RST goes to "L", and the resetting of the counter 105AB ends. CNT_EN_AB goes to "H", which activates the counting of voltage pulses by the counter 105AB. The image capturing period, which is the period in which voltage pulses produced by photons being incident on the APDs 101A and 101B are counted, is started as a result.

At timing t902, a photon is incident on the APD 101A, which produces an avalanche-amplified charge and causes the potential of APD_A to change. The charge is discharged through the quenching resistor 102A, and it therefore takes some time for APD_A to return to a constant potential. The waveform shaping circuit 103A detects the falling edge of APD_A and generates a short voltage pulse. This voltage pulse is input to the counter 105AB via the OR circuit 104AB, and the count value of the counter 105AB becomes 1. From timing t902 to t903, the voltage pulses generated by the waveform shaping circuit 103A and the waveform shaping circuit 103B are counted by the counter 105AB. At timing t903, CAT_EN_AB goes to "L", and the image capturing period ends. At the end of this period, the count value of the counter 105AB is output to the exterior of the unit pixel 700 as the output AB.

Figure 9:
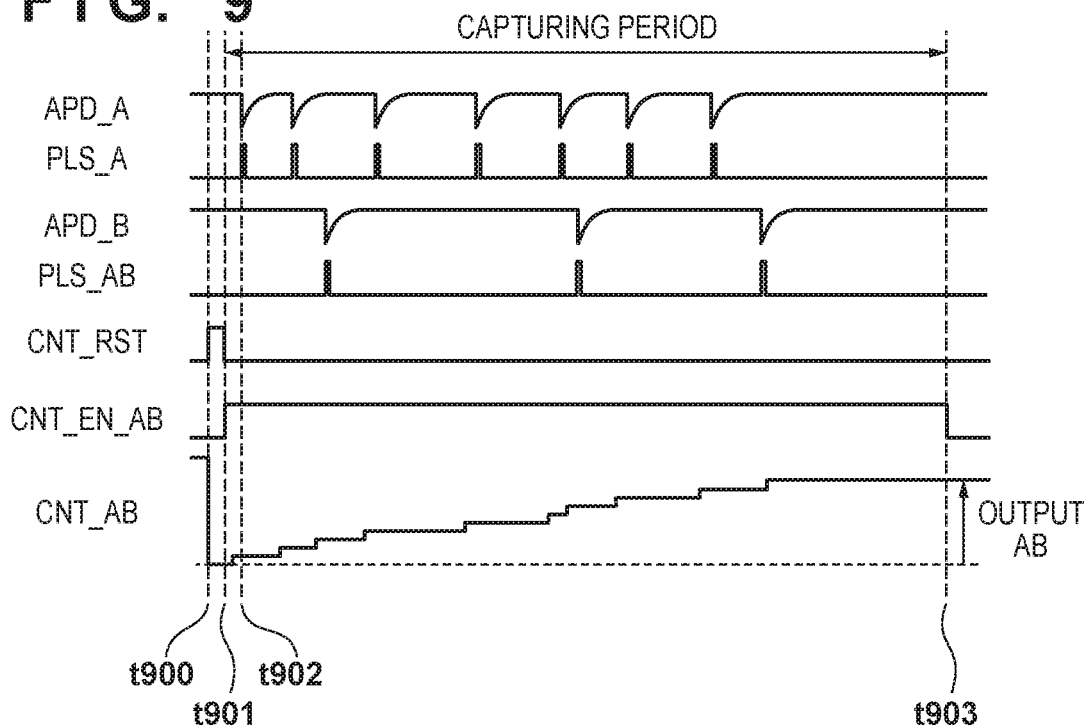
FIG. 9 is a timing chart illustrating operations carried out by unit pixels in non-focus detection lines according to the second embodiment.

With the driving illustrated in FIG. 9, the numbers of photons incident on the APDs 101A and 101B within the image capturing period are counted in the unit pixels 700 located in the non-focus detection lines 802. Additionally, with the driving illustrated in FIG. 3A, the numbers of photons incident on the APDs 101A and 101B within the image capturing period are counted in the unit pixels 100 located in the focus detection lines 201. As a result, the counter 105A can obtain a signal from one of the different regions of the exit pupil. Also, a signal for display and recording can be obtained by counting using the counter 105AB.

In this manner, the circuit scale can be reduced by using a configuration in which the counter A and the counter AB are provided in only the focus detection lines 201, as in the unit pixels 100, and the counter A is not provided in the non-focus detection lines 802, as in the unit pixels 700. However, like the unit pixels 100, the counter 105AB is provided in the unit pixels 700. It is therefore possible to obtain a signal for display and recording by counting using the counter 105AB.

Figure 10:
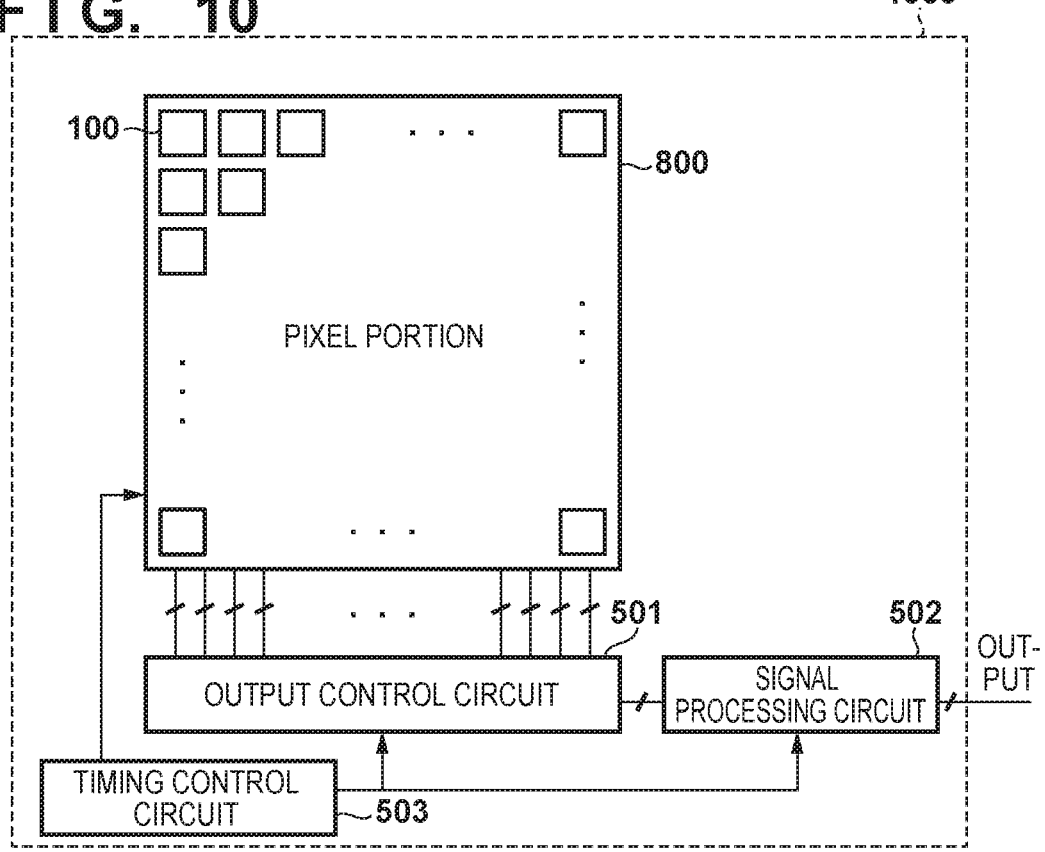
FIG. 10 is a diagram illustrating the configuration of a solid-state image sensor according to the second embodiment.

Next, the configuration of a solid-state image sensor according to the present embodiment will be described using FIG. 10. FIG. 10 is a circuit diagram illustrating the configuration of a solid-state image sensor 1000 according to the present embodiment.

In the solid-state image sensor 1000, many unit pixels 100 are arranged in a matrix in the focus detection lines 201, whereas the unit pixels 700 are arranged in the non-focus detection lines 802. The solid-state image sensor 1000 is also configured including the output control circuit 501, the signal processing circuit 502, and the timing control circuit 503.

The output A and the output AB from each unit pixel 100 arranged in a pixel portion 800 are input to the output control circuit 501, and the signals of the unit pixels 100 and the unit pixels 700 to be output to the signal processing circuit 502 are selected and controlled. For the focus detection lines 201, the signal processing circuit 502 outputs the output A and the output AB from each unit pixel 100 to the exterior of the solid-state image sensor 1000. For the non-focus detection lines 802, the output AB is output to the exterior of the solid-state image sensor 1000.

The timing control circuit 503 outputs drive signals to the pixel portion 800, and also controls the driving timings of the output control circuit 501 and the signal processing circuit 502. By using such a pixel arrangement for the solid-state image sensor 1000, the power consumed can be reduced, and the circuit scale can be reduced even further.

Figure 11:
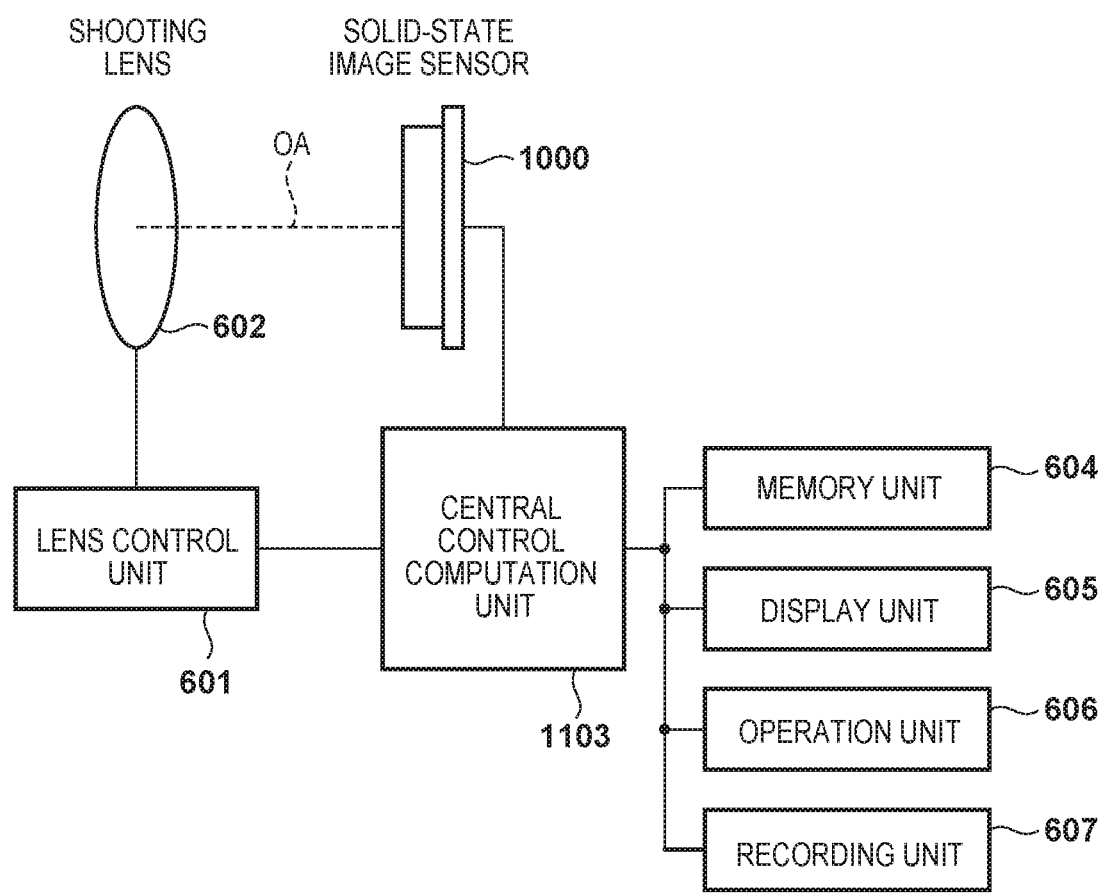
FIG. 11 is a diagram illustrating the configuration of an image capturing apparatus according to the second embodiment.

The configuration of an image capturing apparatus using the solid-state image sensor 1000 will be described next with reference to FIG. 11.

The solid-state image sensor 1000 converts an optical image formed by the shooting lens 602 into an electrical signal. The lens control unit 601 carries out focus driving and aperture driving for the shooting lens 602 in accordance with communication carried out with a central control computation unit 1103.

The central control computation unit 1103 controls the image capturing apparatus as a whole, including controlling the solid-state image sensor 1000, and correcting and developing signals output from the solid-state image sensor 1000. The central control computation unit 1103 furthermore drives the focus detection lines 201, as well as the non-focus detection lines 802 that achieve the reduction in the circuit scale and a reduction in the power consumed, in the pixel portion 800 within the solid-state image sensor 1000.

The central control computation unit 1103 detects a phase difference on the basis of the signals of the outputs A from a plurality of the unit pixels 100 driven as the focus detection lines 201, and signals obtained by subtracting the outputs A from the outputs AB. A focus driving control amount is then communicated to the lens control unit 601 on the basis of the detection result.

Image data is temporarily stored in the memory unit 604, and various types of information, shot images, and the like are displayed in the display unit 605. The operation unit 606 includes various types of interfaces for the image capturing apparatus, and the central control computation unit 1103 controls the various blocks using signals from the operation unit 606. The recording unit 607 is a removable recording unit, such as semiconductor memory or the like, for recording and reading out image data.

Thus in the pixel portion 800, the unit pixels 100 are arranged in the focus detection lines 201, and the pixel values necessary for focus detection are obtained by driving the counters 105A and the counters 105AB. On the other hand, in the non-focus detection lines 802, the counters 105A are not provided in the unit pixels 700, which makes it possible to reduce the circuit scale and further reduce the power consumed.

Third Embodiment

An image capturing apparatus and a driving method thereof according to a third embodiment of the present invention will be described next. In the following, constituent elements that are the same as those in the first embodiment will be given the same symbols and reference signs, and will not be described.

Figure 12:
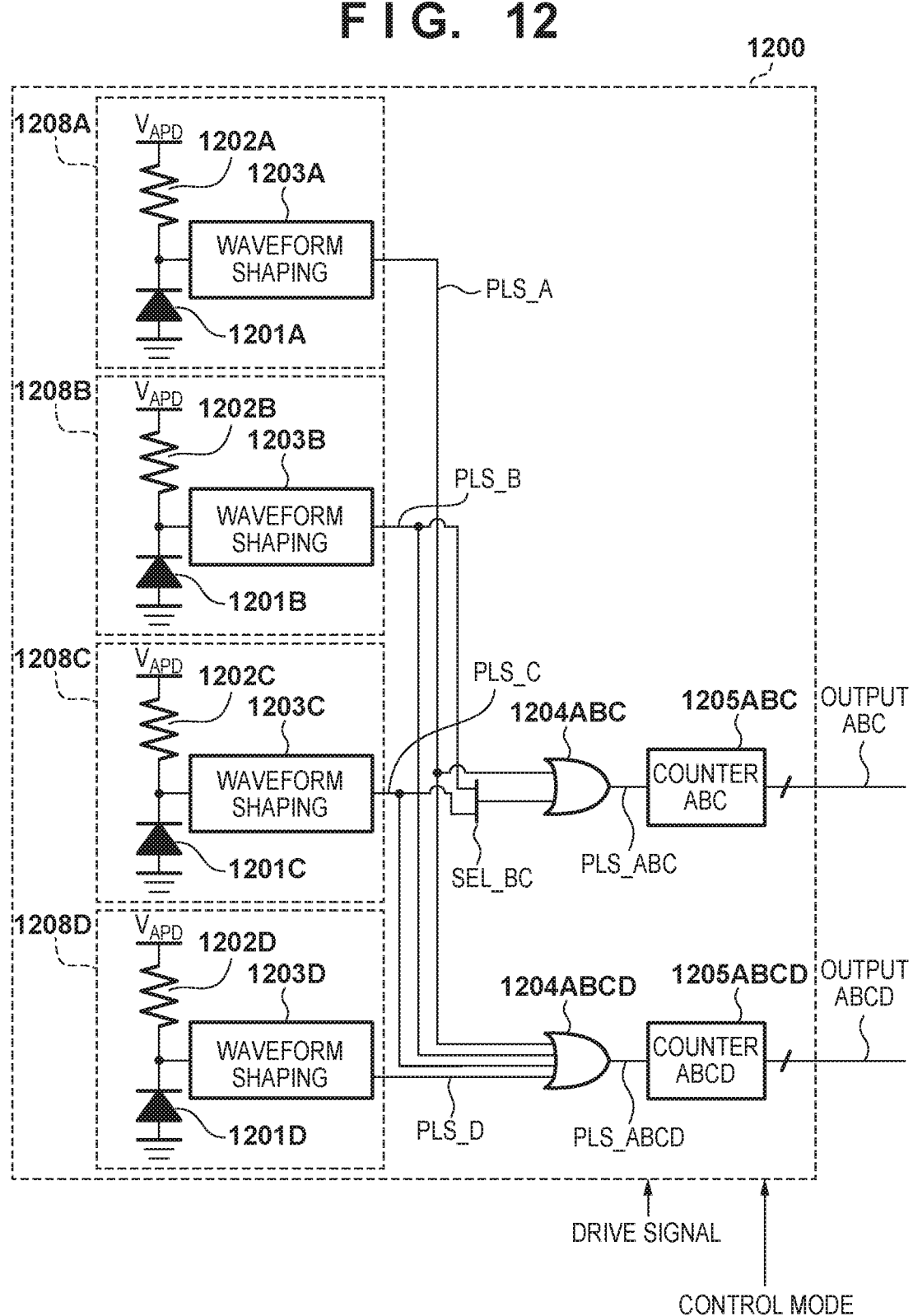
FIG. 12 is a diagram illustrating the configuration of a unit pixel in an image capturing apparatus according to a third embodiment.

The configuration of a unit pixel 1200, which is a constituent element of a solid-state image sensor according to the present embodiment, will be described with reference to FIG. 12. FIG. 12 is a circuit diagram illustrating the configuration of the unit pixel 1200 according to the third embodiment.

The unit pixel 1200 includes avalanche photodiodes ("APDs" hereinafter) 1201A, 1201B, 1201C, and 1201D, and quenching resistors 1202A, 1202B, 1202C, and 1202D. The unit pixel 1200 further includes waveform shaping circuits 1203A, 1203B, 1203C, and 1203D, an OR circuit 104ABC, an OR circuit 1204ABCD, counters 1205ABC and 1205ABCD, and a selector SEL_BC.

In each unit pixel 1200, four APDs 1201 are provided as light-receiving elements. The counter 1205ABC counts the number of photons received by the APD 1201A, as well as the number of photons received by the one of the APD 1201B and the APD 1201C selected by the selector SEL_BC, through the same microlens. A signal can therefore be obtained from one of different regions of the exit pupil.

For example, when the APD 1201B is selected by the selector SEL_BC, the counter 1205ABC counts a value obtained by adding the values from the APD 1201A and the APD 1201B. On the other hand, when, for example, the APD 1201C is selected by the selector SEL_BC, the counter 1205ABC counts a value obtained by adding the values from the APD 1201A and the APD 1201C. The control of the selector SEL_BC will be described later.

A signal for display and recording can be obtained by the counter 1205ABCD counting the number of photons received by the APD 1201A, the APD 1201B, the APD 1201C, and the APD 1201D. Furthermore, a signal can be obtained from the other of the two diff rent regions of the exit pupil by a circuit in a later stage subtracting the count value of the counter 1205ABC from the count value of the counter 1205ABCD.

The individual constituent elements will be described in detail next. The reverse-bias voltage VAPD is connected to the APDs 1201A, 1201B, 1201C, and 1201D via the quenching resistors 1202A, 1202B, 1202C, and 1202D, and charges are produced through avalanche amplification when photons are incident thereon. The produced charges are discharged through the quenching resistors 1202A, 1202B, 1202C, and 1202D. The waveform shaping circuits 1203A, 1203B, 1203C, and 1203D generate voltage pulses by amplifying and detecting edges in the changes of potentials resulting from the generation and discharge of charges based on incident photons.

Thus the APDs 1201, the quenching resistors 1202, and the waveform shaping circuits 1203 function as a 1-bit AD converter by converting whether or not a photon is incident into a voltage pulse.

The result of adding one of PLS_B, which is the output from the waveform shaping circuit 1203B, and PLS_C, which is the output from the waveform shaping circuit 1203C, to PLS_A, which is the output from the waveform shaping circuit 1203A, is input to the counter 1205ABC as PLS_ABC. Which of PLS_B, which is the output from the waveform shaping circuit 1203B, and PLS_C, which is the output from the waveform shaping circuit 1203C, is selected is determined by the direction of the focus detection. Details will be given later.

PLS_A, which is the output from the waveform shaping circuit 1203A, PLS_B, which is the output from the waveform shaping circuit 1203B, PLS_C, which is the output from the waveform shaping circuit 1203C, and PLS_D, which is the output from the waveform shaping circuit 1203D, are input to the counter 1205ABCD via the OR circuit 1204ABCD as PLS_ABCD.

According to this configuration, the counter 1205ABC can obtain a signal from one of the different regions of the exit pupil. The counter 1205ABCD can obtain an image for display and recording by adding the signals from the different regions of the exit pupil.

Here, to simplify the descriptions, the waveform generated by the APD 1201A and the quenching resistor 1202A will be represented by APD_A. Likewise, the waveform generated by the APD 1201B and the quenching resistor 1202B will be represented by APD_B. The waveform generated by the APD 1201C and the quenching resistor 1202C will be represented by APD_C. The waveform generated by the APD 1201D and the quenching resistor 1202D will be represented by APD_D. The output of the OR circuit 1204ABC will be represented by PLS_ABC, and the output of the OR circuit 1204ABCD will be represented by PLS_ABCD. The constituent elements including the APDs 1201A to 1201D, the quenching resistors 1202A to 1202D, and the waveform shaping circuits 1203A to 1203D will be referred to collectively as light receiving portions 1208A to 1208D.

Figure 13:
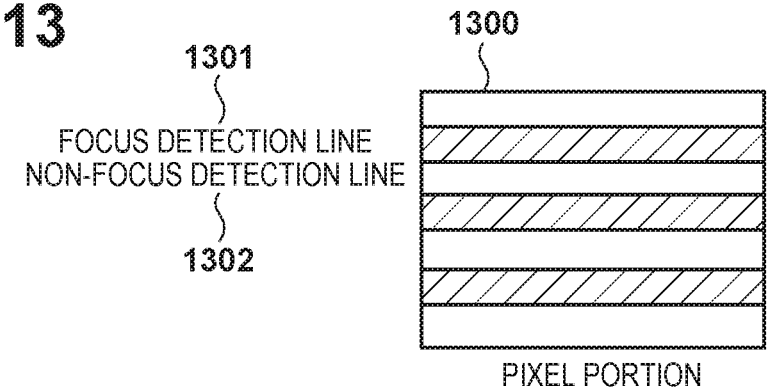
FIG. 13 is a diagram illustrating a pixel portion according to the third embodiment.

A method for driving focus detection lines 1301 and non-focus detection lines 1302 in a pixel portion 1300 will be described next with reference to FIGS. 13, 14A, and 14B. FIG. 13 is a diagram illustrating the pixel portion 1300 in the image sensor, in which many of the unit pixels 1200 are arranged in a matrix, and furthermore indicates the focus detection lines 1301 and the non-focus detection lines 1302.

Figure 14A:
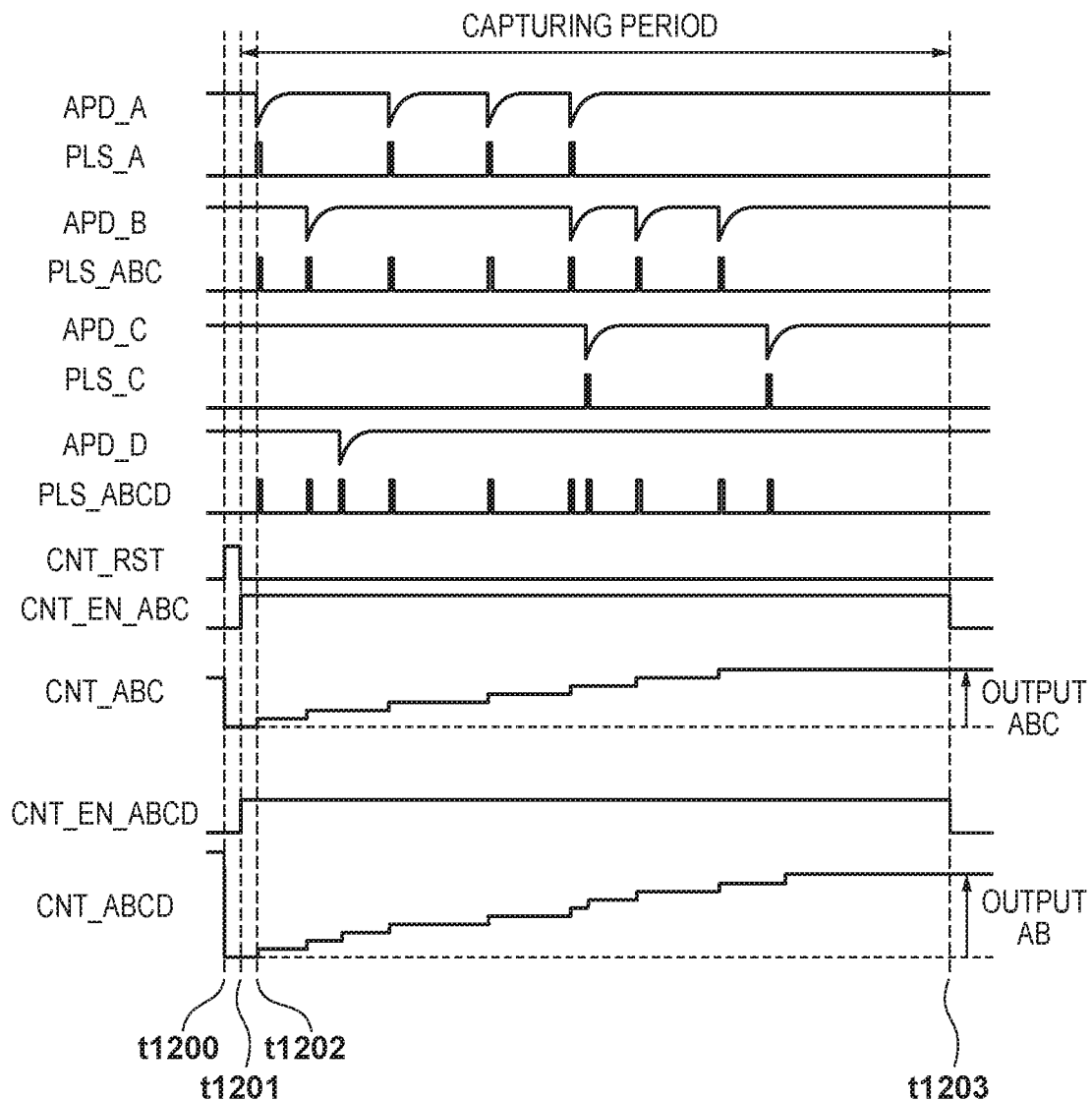
FIG. 14A is a timing chart illustrating operations carried out by unit pixels in focus detection lines according to the third embodiment.

FIG. 14A is a timing chart illustrating the driving of the unit pixels 1200 in the focus detection lines 1301. The present embodiment describes a case where the APD 1201B is selected by the selector SEL_BC, i.e., where the counter 105ABC counts a value obtained by adding the APD 1201A and the APD 1201B. FIG. 14A indicates driving for image capturing in a single unit pixel 1200, and an optical image is converted into a digital signal by carrying out this driving in parallel for a plurality of the unit pixels 1200.

In FIG. 14A, CNT_RST, CNT_EN_ABC, and CNT_EN_ABCD are drive signals, and control the counters 1205ABC and 1205ABCD. The count values of the counters 1205ABC and 1205ABCD are reset to 0 as a result of CNT_RST going to "H". The counter 1205ABC counts the pulse number only during the period when CNT_EN_ABC is "H". The counter 1205ABCD counts the pulse number only during the period when CNT_EN_ABCD is "H". CNT_ABC and CNT_ABCD represent the count values of the counters 1205ABC and 1205ABCD.

To simplify the descriptions, in FIG. 14A, CNT_ABC is driven by PLS_ABC, which is the result of the OR circuit 1204ABC adding PLS_A to one of PLS_B and PLS_C, and expresses a count value in eight levels, from 0 to 7. CNT_ABCD is controlled by PLS_ABCD, which is obtained by the OR circuit 1204ABCD adding PLS_A, PLS_B, PLS_C, and PLS_D, and therefore expresses a count value in 16 levels, from 0 to 15, for double that of CNT_A.

The driving of the unit pixel 1200 will be described next.

At timing t1200, CNT_RST goes to "H", and the count values of the counters 1205ABC and 1205ABCD are reset to 0.

At timing t1201, CNT_RST goes to "L", and the resetting of the counters 1205ABC and 1205ABCD ends. At the same time, CNT_EN_ABC and CNT_EN_ABCD go to "H", which activates the counting of voltage pulses by the counters 1205ABC and 1205ABCD. The image capturing period, which is the period in which voltage pulses produced by photons being incident on the APDs 1201A, 1201B, 1201C, and 1201D are counted, is started as a result.

At timing t1202, a photon is incident on the APD 1201A, which produces an avalanche-amplified charge and causes the potential of APD_A to change. The charge is discharged through the quenching resistor 1202A, and it therefore takes some time for APD_A to return to a constant potential. The waveform shaping circuit 1203A detects the falling edge of APD_A and generates a short voltage pulse. This voltage pulse is input to the counter 1205ABC, and is also input to the counter 1205ABCD via the OR circuit 1204ABCD, and count values of the counter 1205ABC and the counter 1205ABCD become 1 as a result.

In the present embodiment, the APD 1201B is selected by the selector SEL_BC, and thus the counter 1205ABC counts a value obtained by adding the APD 1201A and the APD 1201B.

From timing t1202 to t1203, the voltage pulses generated by the waveform shaping circuit 1203A and the waveform shaping circuit 1203B are counted by the counter 1205ABC. The voltage pulses generated by the waveform shaping circuit 1203A, the waveform shaping circuit 1203B, the waveform shaping circuit 1203C, and the waveform shaping circuit 1203D are counted by the counter 1205ABCD.

At timing t1203, CNT_EN_ABC and CNT_EN_ABCD go to "L", and the image capturing period ends. At the end of this period, the count values of the counters 1205ABC and 1205ABCD are output to the exterior of the unit pixel 1200 as an output ABC and an output ABCD.

By carrying out the driving as illustrated in FIG. 14A, the numbers of photons incident on the APDs 1201A, 1201B, 1201C, and 1201D within the image capturing period are counted. As a result, the counter 1205ABC can obtain a signal from one of the different regions of the exit pupil. Also, a signal for display and recording can be obtained by counting using the counter 1205ABCD.

Figure 14B:
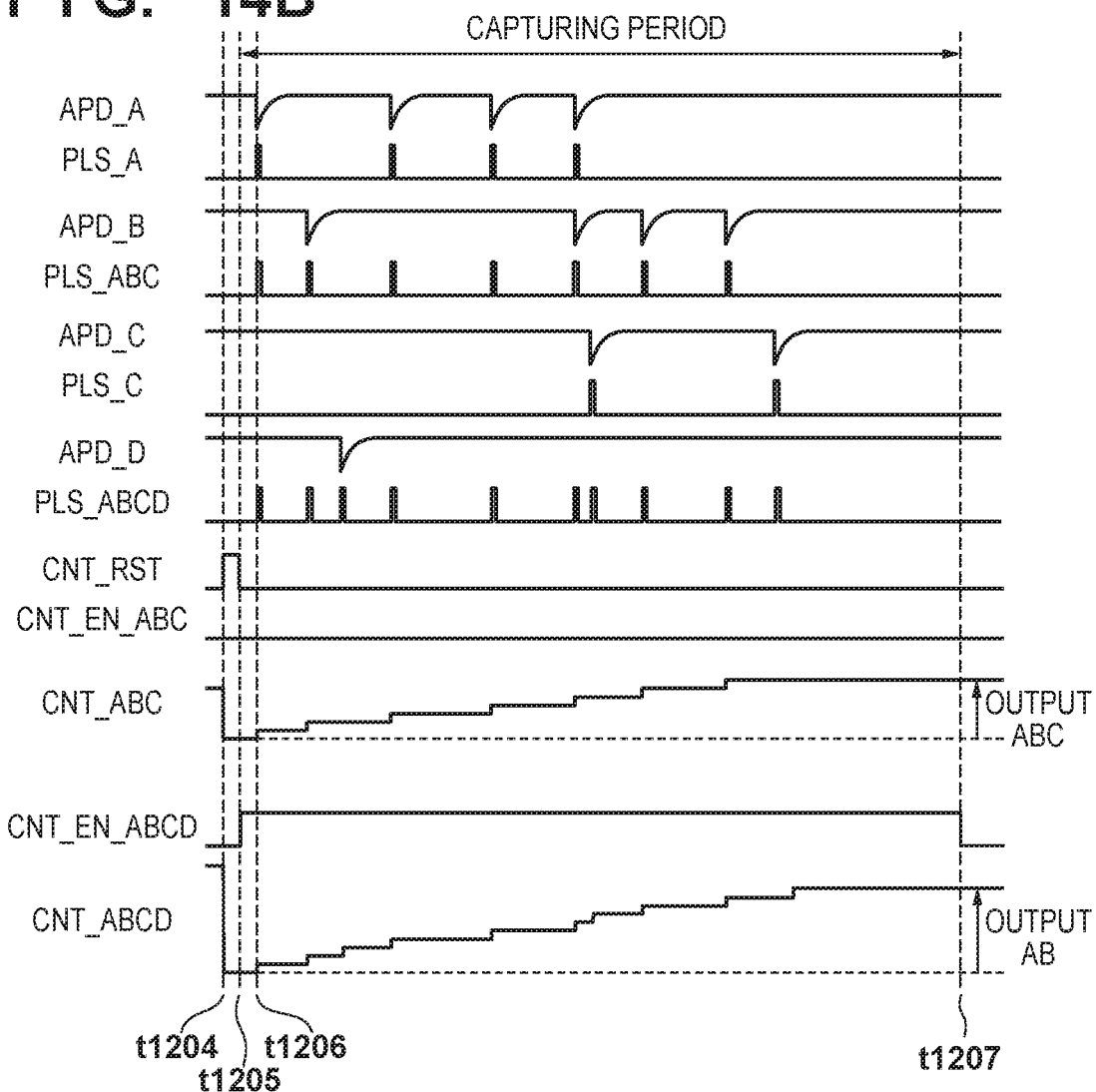
FIG. 14B is a timing chart illustrating operations carried out by unit pixels in non-focus detection lines according to the third embodiment.

FIG. 14B is a timing chart illustrating the driving of the unit pixels 1200 in the non-focus detection lines 1302. FIG. 14B indicates driving for image capturing in a single unit pixel 1200, and an optical image is converted into a digital signal by carrying out this driving in parallel for a plurality of the unit pixels 1200.

At timing t1204, CNT_RST goes to "H", and the count value of the counter 1205ABCD is reset to 0. As will be described later, in the non-focus detection lines, there is no need to count the counter 1205ABC in the unit pixels 1200. Thus to reduce the power consumed, the clock is turned off by using clock gating or the like to hold the values at "0" in the counter 1205ABC, regardless of whether or not CNT_RST goes to "H".

At timing t1205, CNT_RST goes to "L", and the resetting of the counter 1205ABCD ends. Then, CNT_EN_ABC remains at "L", and the counting operations of the counter 1205ABC remain inactive by using clock gating or the like in order to reduce the power consumed. On the other hand, CNT_EN_ABCD goes to "H", which activates the counting of voltage pulses by the counter 1205ABCD. The image capturing period, which is the period in which voltage pulses produced by photons being incident on the APDs 1201A, 1201B, 1201C, and 1201D are counted, is started as a result.

At timing t1206, a photon is incident on the APD 1201A, which produces an avalanche-amplified charge and causes the potential of APD_A to change. The charge is discharged through the quenching resistor 1202A, and it therefore takes some time for APD_A to return to a constant potential. The waveform shaping circuit 1203A detects the falling edge of APD_A and generates a short voltage pulse. This voltage pulse is input to the counter 1205ABC via the OR circuit 1204ABC, and is also input to the counter 1205ABCD via the OR circuit 1204ABCD, and count value of the counter 1205ABCD becomes 1 as a result. The counting operations of the counter 1205ABC remain inactive by using clock gating or the like to reduce the power consumed, and the count therefore does not increase.

At timing t1206 to t1207, the voltage pulses generated by the waveform shaping circuit 1203A, the waveform shaping circuit 1203B, the waveform shaping circuit 1203C, and the waveform shaping circuit 1203D are counted by the counter 1205ABCD. At timing t1207, CNT_EN_ABCD goes to "L", and the image capturing period ends. At the end of this period, the count value of the counter 1205ABCD is output to the exterior of the unit pixel 1200 as the output ABCD.

By carrying out the driving as illustrated in FIG. 14B, the numbers of photons incident on the APDs 1201A, 1201B, 1201C, and 1201D within the image capturing period are counted. On the other hand, the counter 1205ABC does not operate, by using clock gating or the like. This makes it possible to achieve a reduction in the power consumed.

Also, a signal for display and recording can be obtained by counting using the counter 1205ABCD.

Figure 15:
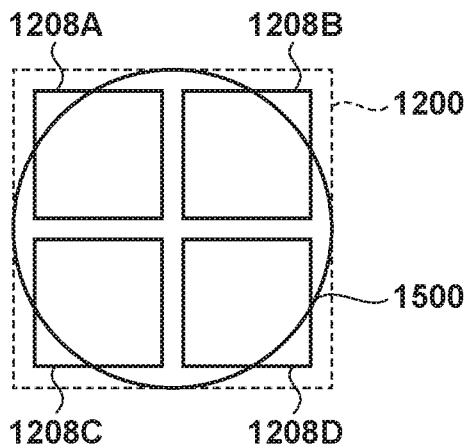
FIG. 15 is a diagram illustrating a pupil division method according to the third embodiment.

The structure of the unit pixel 1200 according to the third embodiment of the present invention will be described next with reference to FIG. 15. FIG. 15 is a diagram illustrating the arrangement of the light receiving portions 1208 in the unit pixel 1200, according to the third embodiment.

As illustrated in FIG. 15, the light receiving portions 1208A to 1208D are arranged so that the region on which light passing through a single microlens 1500 is incident is divided into four parts, i.e., top, bottom, left, and right, parts. Using such an arrangement makes it possible to obtain signals from the parts of the pupil region divided in the vertical direction, and from the parts divided in the horizontal direction, which in turn makes it possible to effectively detect phase differences in the vertical and horizontal directions. For example, with an image capturing apparatus in which the pupil region is divided only in the horizontal direction, image capturing plane-phase difference AF can be carried out accurately for an object which has major contrast changes in the horizontal direction, such as an object with large vertical lines. However, accurate phase difference AF is difficult to achieve for an object with only small contrast changes in the horizontal direction, such as an object with horizontal lines. On the other hand, with an image capturing apparatus in which the pupil region can be divided in both the vertical and horizontal directions, the signals to be used for image capturing plane-phase difference AF can be selected in accordance with the direction in which the object changes the most, which broadens the conditions of objects for which the image capturing plane-phase difference AF can be carried out accurately. More specifically, horizontal lines can be detected by comparing a signal obtained by adding together the results of counting the voltage pulses in the light receiving portions 1208A and 1208B, with a signal obtained by adding together the results of counting the voltage pulses in the light receiving portions 1208C and 1208D. On the other hand, vertical lines can be detected by comparing a signal obtained by adding together the results of counting the voltage pulses in the light receiving portions 1208A and 1208C, with a signal obtained by adding together the results of counting the voltage pulses in the light receiving portions 1208B and 1208D.

Figure 16:
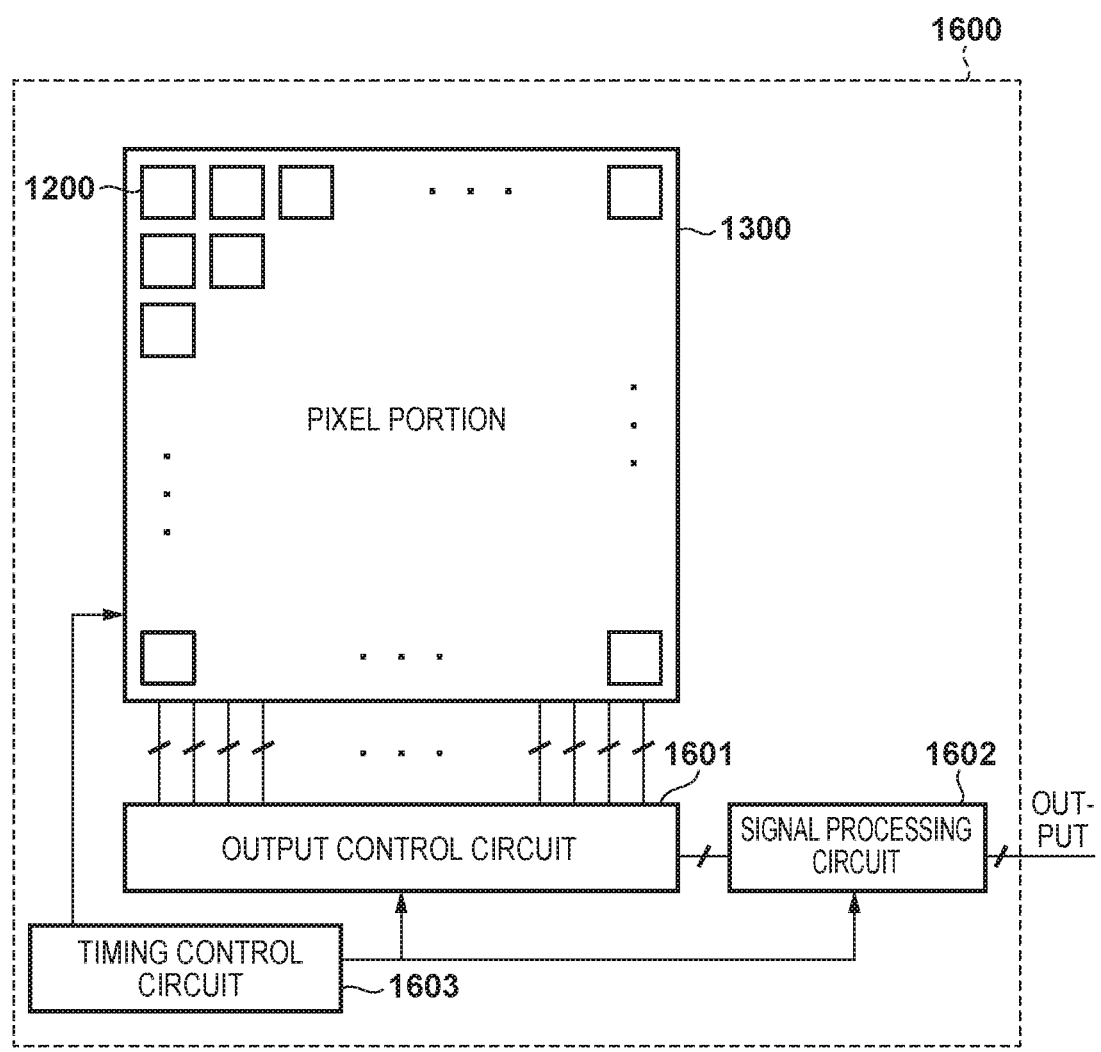
FIG. 16 is a diagram illustrating the configuration of a solid-state image sensor according to the third embodiment.

Next, the configuration of a solid-state image sensor according to the present embodiment will be described using FIG. 16. FIG. 16 is a circuit diagram illustrating the configuration of a solid-state image sensor 1600.

The solid-state image sensor 1600 is configured including the pixel portion 1300, in which many of the unit pixels 1200 are arranged in a matrix, as well as an output control circuit 1601, a signal processing circuit 1602, and a timing control circuit 1603.

The output ABC and the output ABCD from each unit pixel 1200 arranged in the pixel portion 1300 are input to the output control circuit 1601, and the signals of the unit pixels 1200 to be output to the signal processing circuit 1602 are selected and controlled. For the focus detection lines 1301, the signal processing circuit 1602 outputs the output ABC and the output ABCD from each unit pixel 1200 to the exterior of the solid-state image sensor 1600. On the other hand, for the non-focus detection lines, the counter 1205ABC does not operate, by using clock gating or the like, and thus only the output ABCD is output to the exterior of the solid-state image sensor 1600.

The timing control circuit 1603 outputs drive signals to the pixel portion 1300, and also controls the driving timings of the output control circuit 1601 and the signal processing circuit 1602. Carrying out such driving for the counter 1205ABC makes it possible to reduce the power consumed.

Figure 17:
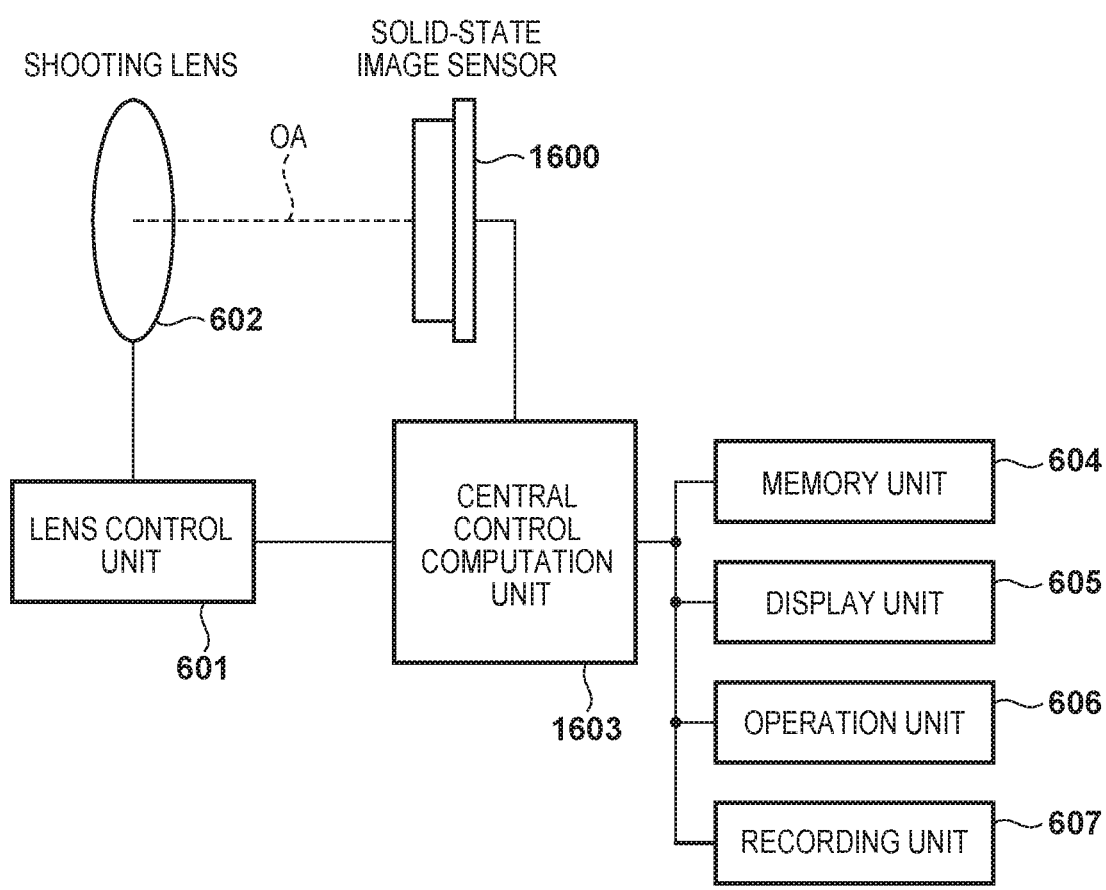
FIG. 17 is a diagram illustrating the configuration of an image capturing apparatus according to the third embodiment.

The configuration of an image capturing apparatus using the solid-state image sensor 1600 will be described next with reference to FIG. 17.

The solid-state image sensor 1600 converts an optical image formed by the shooting lens 602 into an electrical signal. The lens control unit 601 carries out focus driving and aperture driving for the shooting lens 602 in response to instructions from a central control computation unit 1603.

The central control computation unit 1603 controls the image capturing apparatus as a whole, including controlling the solid-state image sensor 1600, and correcting and developing signals output from the solid-state image sensor 1600. The central control computation unit 1603 furthermore determines whether to drive the pixel portion 1300 in the solid-state image sensor 1600 as the focus detection lines 1301, or as the non-focus detection lines 1302 for reducing the power consumed. The central control computation unit 1603 also controls SEL_BC within the pixel portion 1300 to determine whether to carry out the phase difference detection in the vertical direction or the horizontal direction.

The central control computation unit 1603 detects a phase difference on the basis of the signals of the outputs ABC from a plurality of the unit pixels 1200 driven as the focus detection lines 1301, and signals obtained by subtracting the outputs ABC from the outputs ABCD. A focus driving control amount is then communicated to the lens control unit 601 on the basis of the detection result.

Image data is temporarily stored in the memory unit 604, and various types of information, shot images, and the like are displayed in the display unit 605. The operation unit 606 includes various types of interfaces for the image capturing apparatus, and the central control computation unit 1603 controls the various blocks using signals from the operation unit 606. The recording unit 607 is a removable recording unit, such as semiconductor memory or the like, for recording and reading out image data.

In this manner, for the focus detection lines 1301, the counters 1205ABC and the counters 1205ABCD in the unit pixels 1200 within the pixel portion 1300 are driven to obtain the pixel values required for focus detection. On the other hand, for the non-focus detection lines 1302, the counters 1205ABC are not driven by using clock gating or the like, which makes it possible to reduce the power consumed.

Fourth Embodiment

Figure 19:
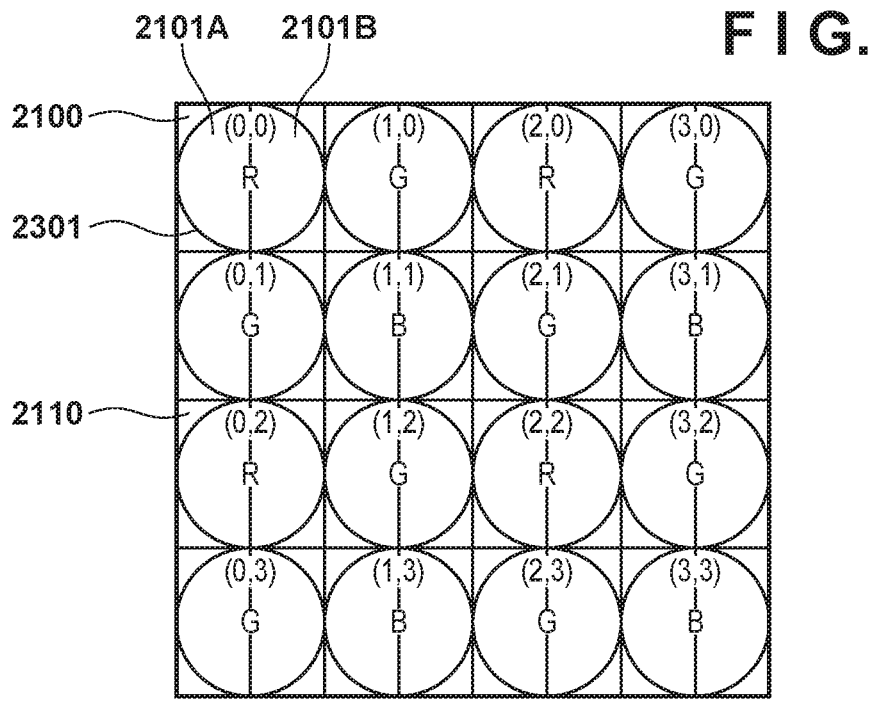
FIG. 19 is a top view of an image sensor according to the fourth embodiment.

FIG. 18 is a circuit diagram illustrating the configurations of unit pixels 2100 and 2110 according to a fourth embodiment of the present invention. As illustrated in FIG. 19, the unit pixels 2100 and 2110 each correspond to one pixel below microlenses 2301, which are arranged two-dimensionally. Furthermore, a single color filter is provided beneath each microlens 2301, forming a Bayer array in which the upper-left pixel is an R pixel. The unit pixel 2100 is the R pixel at the upper-left (0,0), and the unit pixel 2110 is the R pixel two pixels below the unit pixel 2100 (0,2). The unit pixels 2100 and 2110 include avalanche photodiodes ("APDs" hereinafter) 2101A and 2101B, quenching resistors 2102A and 2102B, waveform shaping circuits 2103A and 2103B, and counters 2104A and 2104B. Adders 2105 and 2108 that add the count values from the two counters, and selectors 2106 and 2107 that select input signals for the adders 2105 and 2108, are also provided.

Two of the APDs 2101 are provided in the unit pixels 2100 and 2110 as light-receiving elements, and signals from different regions of the exit pupil can be obtained by the APDs 2101A and 2101B receiving light that has passed through the same microlens. A captured image is generated by the adders 2105 and 2108 adding the signals from the two light-receiving elements.

The individual constituent elements will be described in detail next.

The APDs 2101A and 2101B are connected to a reverse-bias voltage VAPD through the quenching resistors 2102A and 2102B, and each produces a charge through avalanche amplification when a photon is incident thereon. The charges are discharged through the quenching resistors 2102A and 2102B. The waveform shaping circuits 2103A and 2103B generate voltage pulses by amplifying and detecting edges in the changes of potentials resulting from the generation and discharge of charges based on incident photons. Thus the APDs 2101, the quenching resistors 2102, and the waveform shaping circuits 2103 function as a 1-bit AD converter by converting whether or not a photon is incident into a voltage pulse.

The voltage pulses that are the outputs from the waveform shaping circuits 2103A and 2103B are input to the counters 2104A and 2104B, respectively. The counters 2104A and 2104B, which serve as counting units, count the voltage pulses. Resetting and enabling of the counting by the counters 2104A and 2104B is controlled by drive signals input to the unit pixels. The adder 2105 adds two input values, which are the outputs from the counter 2104A and the selector 2106. The adder 2108 adds two input values, which are the outputs from the counter 2104A and the selector 2107. The selector 2106 selects one of three inputs in response to a control signal input to the unit pixel. When the control signal is "0", the count value of the counter 2104B is selected; when "1", the count value of the counter 2104A in the unit pixel 2110 is selected; and when "2", a value of "0" is selected.

In other words, when the control signal is "0", a captured image is output to the exterior of the unit pixel 2100; and when the control signal is "1", a focus detection pixel obtained by adding the counter 2104A in the unit pixel 2100 and the counter 2104A in the unit pixel 2110 is output. Furthermore, when the control signal is "2", the count result from only the counter 2104A in the unit pixel 2100 is output as the focus detection pixel.

The selector 2107 selects one of two inputs in response to a control signal input to the unit pixel. When the control signal is "0", the counter 2104B is selected; and when "1", a value of "0" is selected. In other words, when the control signal is "0", a captured image is output to the exterior of the unit pixel 2110; and when the control signal is "1", the count result from only the counter 2104A in the unit pixel 2110 is output as the focus detection pixel. Specific transitions of the control signals will be described later.

To simplify the subsequent descriptions, the waveform generated by the APD 2101A and the quenching resistor 2102A will be represented by APD_A, and the waveform generated by the APD 2101B and the quenching resistor 2102B will be represented by APD_B. The output of the waveform shaping circuit 2103A will be represented by PLS_A, and the output of the waveform shaping circuit 2103B will be represented by PLS_B.

Figure 20:
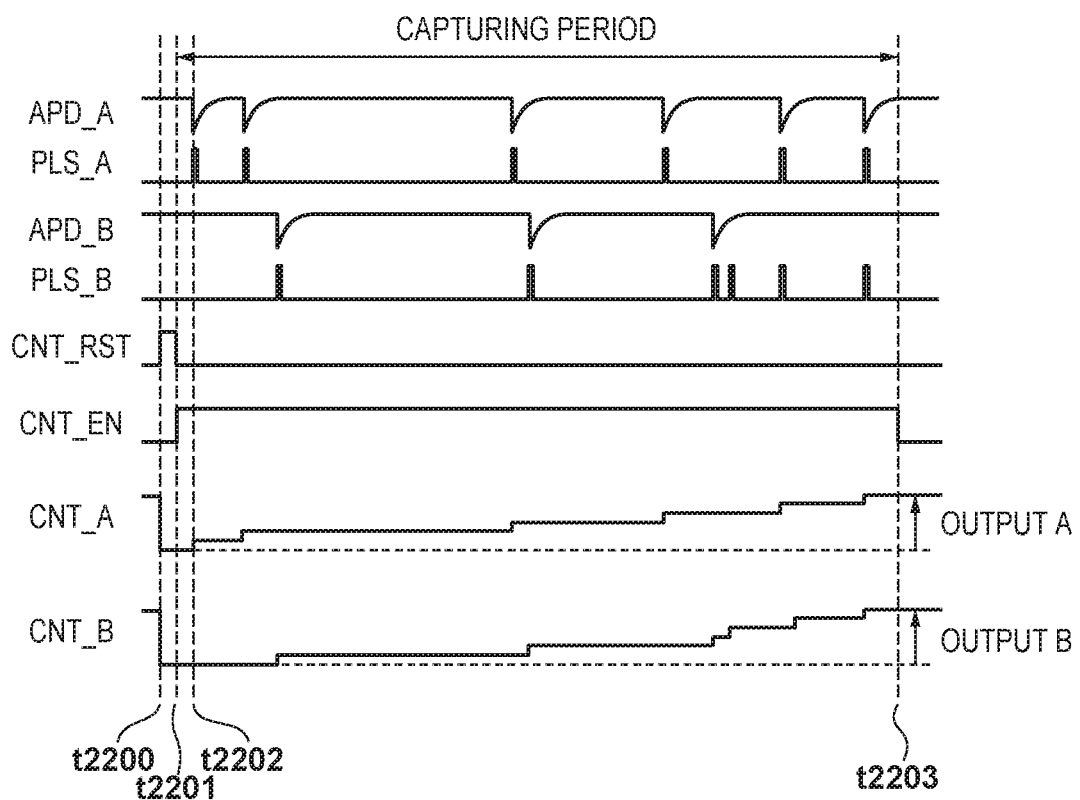
FIG. 20 is a timing chart illustrating operations carried out by the unit pixel according to the fourth embodiment.

FIG. 20 is a timing chart illustrating driving of the unit pixels 2100 and 2110. FIG. 20 indicates driving for image capturing in one each of the unit pixels 2100 and 2110, as well as transitions in the count values, and an optical image is converted into a digital signal by carrying out this driving in parallel for a plurality of the unit pixels 2100 and 2110.

In FIG. 20, CNT_RST and CNT_EN represent drive signals, which control the counters 2104A and 2104B. The count values of the counters 2104A and 2104B are reset to 0 as a result of CNT_RST going to "H". The counters 2104A and 2104B count pulse numbers only during the period when CNT_EN is "H". CNT_A and CNT_B represent the count values of the counters 2104A and 2104B.

The driving of the unit pixels 2100 and 2110 will be described next.

At timing t2200, CNT_RST goes to "H", and the count values of the counters 2104A and 2104B are reset to "0".

At timing t2201, CNT_RST goes to "L", and the resetting of the counters 2104A and 2104B ends. At the same time, CNT_EN goes to "H", which activates the counting of voltage pulses by the counters 2104A and 2104B. The image capturing period, which is the period in which voltage pulses produced by photons being incident on the APDs 2101A and 2101B are counted, is started as a result.

At timing t2202, a photon is incident on the APD 2101A, which produces an avalanche-amplified charge and causes the potential of APD_A to change. The charge is discharged through the quenching resistor 2102A, and it therefore takes some time for APD_A to return to a constant potential. The waveform shaping circuit 2103A detects the falling edge of APD_A and generates a short voltage pulse. This voltage pulse is input to the counter 2104A, and the count value of the counter 2104A becomes "1". During the period from timing t2202 to t2203, the voltage pulses generated by the waveform shaping circuit 2103A are counted by die counter 2104A, and the voltage pulses generated by the waveform shaping circuit 2103B are counted by the counter 2104B.

At timing t2203, CNT_EN goes to "L", and the image capturing period ends. At the end of this period, the count values of the counters 2104A and 2104B are output to the exterior of the unit pixels 2100 and 2110 via the adders 2105 and 2108. Alternatively, the count values are input to the selectors 2106 and 2107, and are then output to the exterior of the unit pixels 2100 and 2110 via the adders 2105 and 2108.

Returning to FIG. 19, the structure of an image sensor according to the present embodiment will be described. In the present embodiment, the area below each of the individual microlenses 2301 which form a microlens array is defined as a single pixel, and these correspond to the unit pixels 2100 and 2110. Furthermore, a plurality of divided pixels are arranged so as to correspond to a single microlens 2301. Note that in the present embodiment, two divided pixels are arranged in the X-axis direction in the unit pixels 2100 and 2110, and these correspond to the APDs 2101A and 2101B, respectively.

Figure 21:
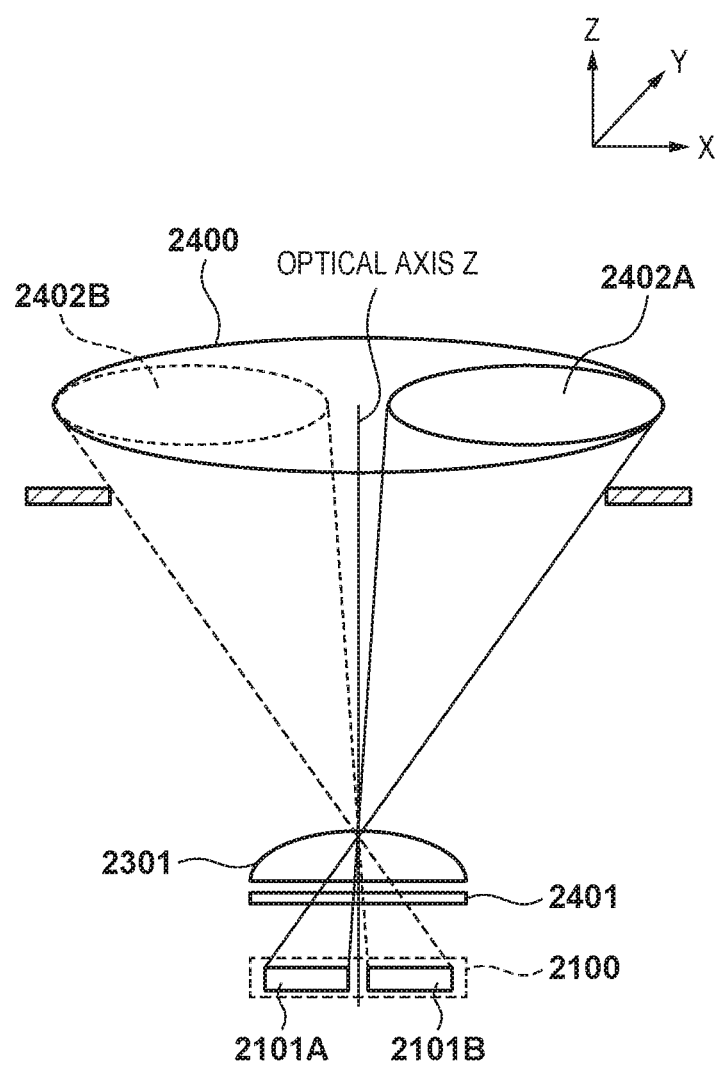
FIG. 21 is a conceptual diagram illustrating light beams exiting from an exit pupil of a shooting lens and being incident on a unit pixel.

The principles of pupil-division focus detection according to the present embodiment will be described next with reference to FIG. 21. FIG. 21 is a conceptual diagram illustrating light beams exiting from an exit pupil of a shooting lens and being incident on a unit pixel. As described earlier, the APD 2101A and the APD 2101B are arranged in the unit pixel 2100.

As illustrated in FIG. 21, a light beam exiting from an exit pupil 2400 passes through the microlens 2301 and a color filter 2401, and is incident on the unit pixel 2100, central to an optical axis Z. The light beams passing through a pupil region 2402A and a pupil region 2402B, which indicate partial regions of the exit pupil 2400, are incident on the APD 2101A and the APD 2101B, respectively. As such, the APD 2101A and the APD 2101B receive light from different regions of the exit pupil in the shooting lens.

The signal from the APD 2101A configured in this manner is obtained from a plurality of the unit pixels 2100 arranged in the X-axis direction, and a subject image constituted by a group of these output signals is taken as an A image. Likewise, the signal from the APD 2101B is obtained from a plurality of the unit pixels 2100 arranged in the X-axis direction, and a subject image constituted by a group of these output signals is taken as a B image. A correlation computation is carried out on the obtained A image and B image, and a skew amount (pupil division phase difference) between the images is detected. Furthermore, multiplying the image skew amount by a conversion coefficient determined from the focal position and the optical system makes it possible to detect a focal position corresponding to a desired object position in the screen. Image plane phase difference AF can then be carried out by controlling a focus lens (not shown) on the basis of the focal position information calculated here. Note also that by adding the A image signal and the B image signal to obtain an A+B image signal, the A+B image signal can be used for image data. In other words, the A image and the B image are signals from focus detection pixels, and art A+B image is a signal from image capturing pixels.

Figure 22:
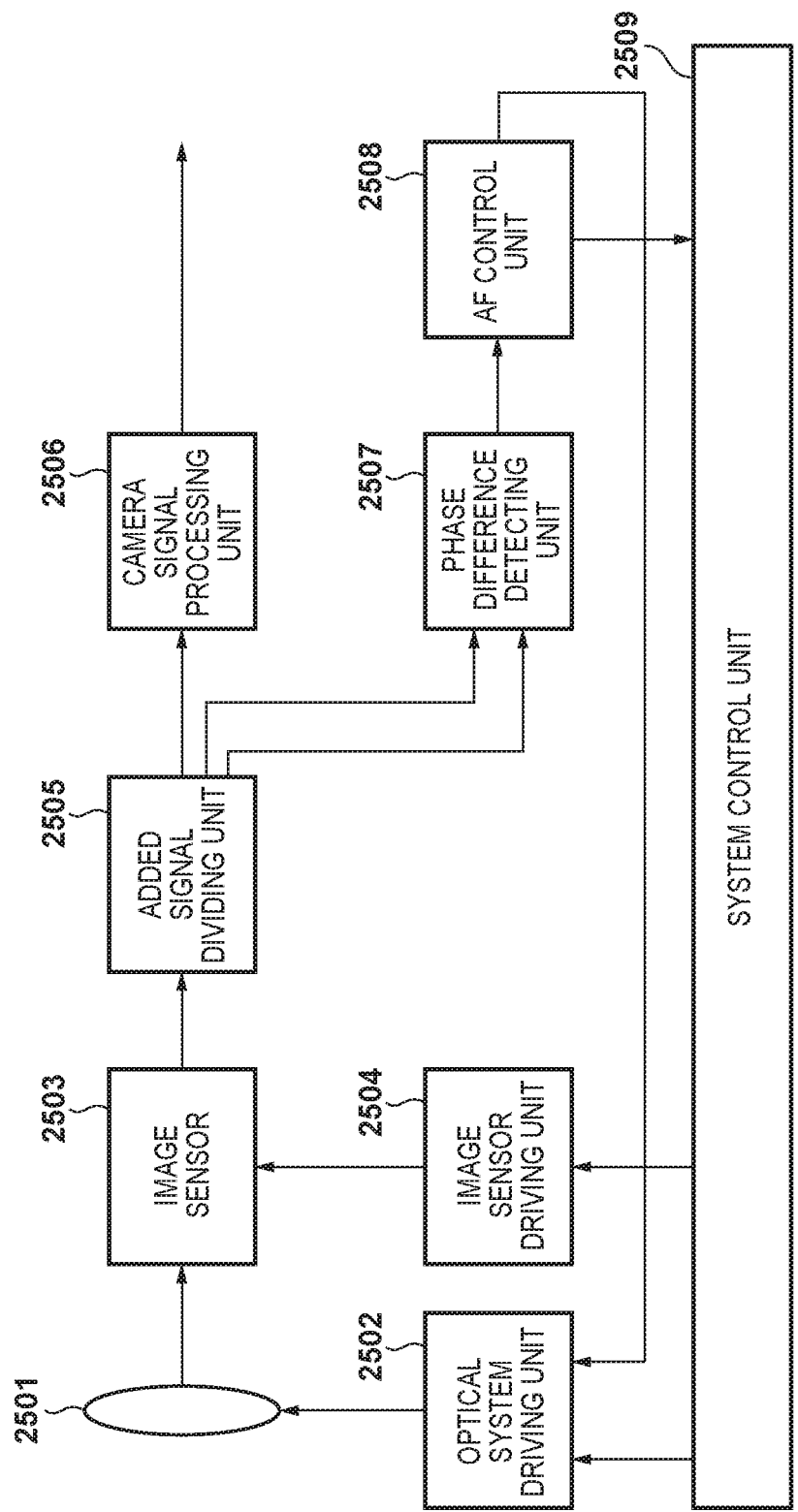
FIG. 22 is a block diagram illustrating the configuration of an image capturing apparatus according to the fourth embodiment.

FIG. 22 is a block diagram illustrating the configuration of an image capturing apparatus according to the present embodiment.

In FIG. 22, an optical system 2501 is constituted by at least one of a zoom lens, an aperture, and a focus lens, and forms a subject image. An optical system driving unit 2502 controls the optical system 2501 in accordance with focus information output from an AF control unit 2508 (mentioned later), optical system driving information from a system control unit 2509, and so on. An image sensor 2503 converts the subject image into an electrical signal through photoelectric conversion, and outputs a captured image or a focus detection image. An image sensor driving unit 2504 controls the image sensor 2503 in accordance with image sensor driving instruction information from the system control unit 2509. Note that the image sensor 2503 outputs a captured image signal or a focus detection image signal in response to a control signal for controlling the selectors 2106 and 2107, output from the image sensor driving unit 2504.

The image capturing pixel signal (A+B image) output from the image sensor 2503, and the focus detection pixel signal (the A image), are input to an added signal dividing unit 2505. Here, the focus detection pixel signal (the A image) is subtracted from the image capturing pixel signal (the A+B image) to generate the other focus detection pixel signal (the B image). The two focus detection pixel signals (the A image and the B image) are output to a phase difference detecting unit 2507, and the image capturing pixel signal (the A+B image) is output to a camera signal processing unit 2506. Although detailed descriptions will not be given here, one of the image capturing pixel signal (the A+B image) and the focus detection pixel signal (the A image) is output in order from the image sensor 2503, and thus the added signal dividing unit 2505 includes memory for standing by for the two image signals in order to carry out the subtraction.

The camera signal processing unit 2506 carries out known image processing such as color conversion processing or white balance processing on the image signal obtained from the added signal dividing unit 2505. The image signal which has been subjected to various types of image processing by the camera signal processing unit 2506 is compressed/ encoded by compression means (not shown) and recorded into a recording medium. Here, the recording medium may be removable from the image capturing apparatus, or may be built into the image capturing apparatus.

The phase difference detecting unit 2507 calculates a phase difference evaluation value, for detecting a phase difference, from the two pupil-division images obtained from the added signal dividing unit 2505. The AF control unit 2508 calculates the focus information, for controlling a focus position of the optical system 2501, on the basis of the phase difference evaluation value output from the phase difference detecting unit 2507.

The system control unit 2509 controls the image capturing apparatus as a whole. On the basis of shooting information obtained from a shot scene, a shooting mode (image capturing mode), and the like, the system control unit 2509 outputs optical system driving information, such as for the zoom and aperture, to the optical system driving unit 2502. The system control unit 2509 also outputs image sensor driving information, such as an exposure time, a readout starting position and readout interval of the pupil-division image signals, and the like, to the image sensor driving unit 2504.

Figure 23A:
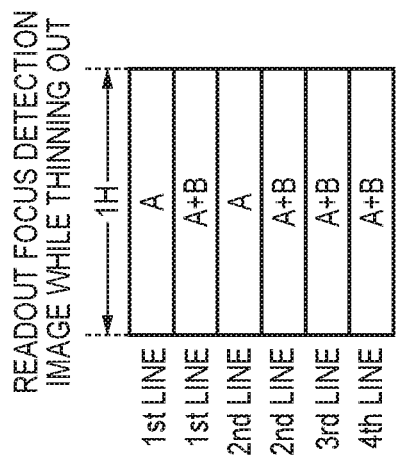
FIGS. 23A to 23C are diagrams illustrating image sensor driving modes and readout data according to the fourth embodiment.
Figure 23B:
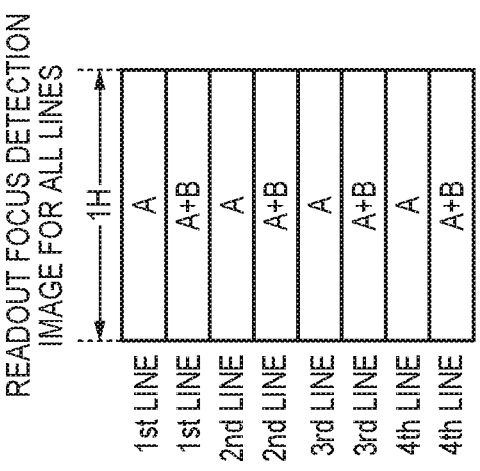
Figure 23C:
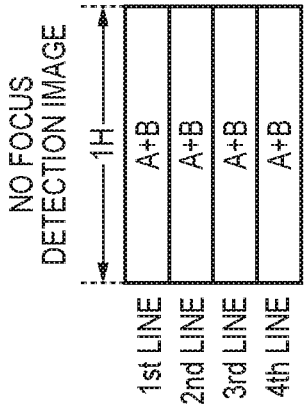

FIGS. 23A to 23C are diagrams illustrating readout signals in different driving modes of the image sensor 2503 according to the fourth embodiment.

FIG. 23A is a diagram illustrating readout signals in a driving mode in which the focus detection pixel signal (the A image) is not read out. The readout signal is only the image signal (the A+B image), and a total of four lines are read out. Note that in this driving mode, image capturing-plane phase difference focus detection is not carried out, and the focus detection is carried out using a known contrast-based method, for example.

FIG. 23B is a diagram illustrating readout signals in a driving mode in which the focus detection pixel signal (the A image) is read out for all lines. A total of eight lines are read out, i.e., four lines' worth of the focus detection pixel signal (the A image) and four lines' worth of the image signal (the A+B image).

FIG. 23C is a diagram illustrating readout signals in a driving mode in which the focus detection pixel signal (the A image) is read out while being thinned out. By reading out the focus detection pixel signal (the A image) for only the first and second lines, but skipping the third and fourth lines, a total of six lines are read out, i.e., two lines' worth of the focus detection pixel signal and four lines' worth of the image signal (the A+B image).

In the situation described above, FIG. 23A is assumed to illustrate the driving mode with the lowest amount of readout, which realizes a high framerate. FIG. 23B is assumed to illustrate the driving mode with the highest amount of readout, which realizes a high framerate. FIG. 23C is assumed to realize a medium framerate between the high framerate and the low framerate.

Operations of the selectors 2106 and 2107 illustrated in FIG. 18 will be described next using FIGS. 24A to 24C. The selector values illustrated in FIGS. 24A, 24B, and 24C correspond to readouts in the driving mode illustrated in FIGS. 23A, 23B, and 23C, respectively. VD represents a frame synchronization signal, and one frame's worth of an exposure period starts upon the frame synchronization signal VD going to H. CNT_RST represents a reset signal for the counters 2104; when CNT_RST goes to "H", the counters 2104 are reset, and when CNT_RST goes to "L", the resetting is canceled. CNT_EN, PLS_A, and CNT_A are the same as in FIG. 20 and will therefore not be described here.

A horizontal synchronization signal HD is supplied upon entering a readout period, and each time the horizontal synchronization signal HD goes to "H", one line each of the pixels in a pixel region are selected in order, and signals are output to the exterior of the image sensor 2503.

The selector 2106 and the selector 2107 will be described here.

Figure 24A:
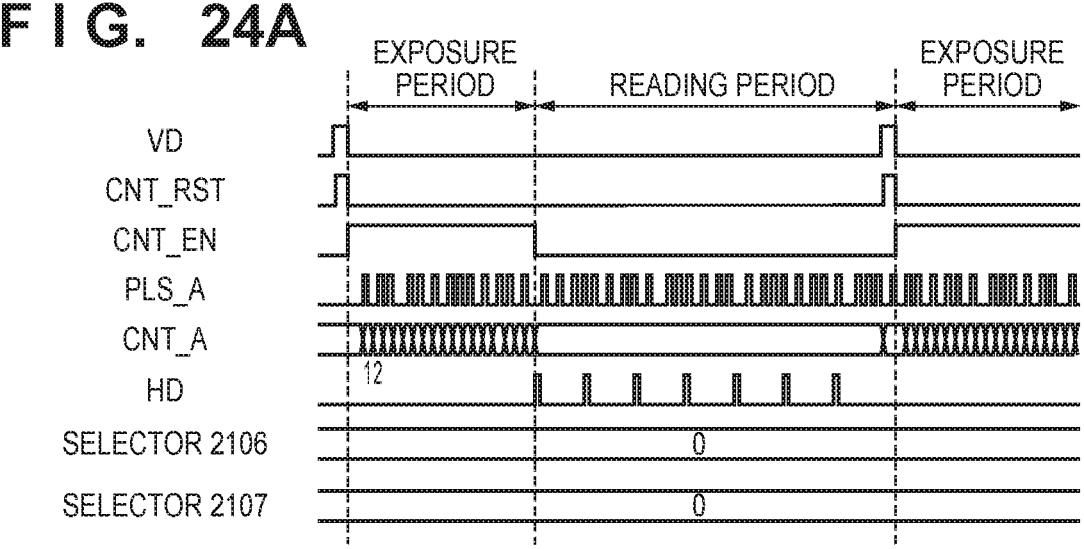
FIGS. 24A to 24C are diagrams illustrating the transitions of selectors according to the fourth embodiment.

FIG. 24A illustrates a case where the selectors 2106 and 2107 are "0", which corresponds to the driving mode in FIG. 23A, where only the A+B image is read out. Accordingly, the selectors 2106 and 2107 remain at "0", and select the count value of the counter 2104B. The adders 2105 and 2108 add the count value of the counter 2104A and the count value of the counter 2104B, and output the A+B image.

Figure 24B:
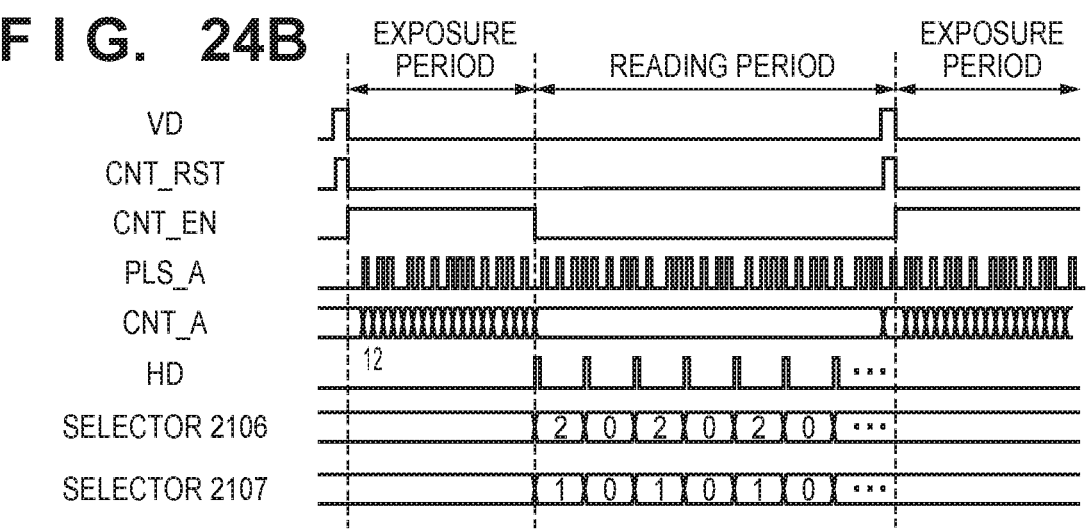

FIG. 24B illustrates a case where the selector 2106 repeats "2", "0", "2", and "0", which corresponds to the driving mode illustrated in FIG. 23B. Specifically, in FIG. 23B, the A image and the A+B image are read out for all lines. A value of "0" is selected by setting the selector 2106 to "2". The count value of the counter A and the value of "0" are input to the adder 2105, and thus the output of the adder 2105 is the A image. On the other hand, the selector 2107 repeats "1", "0", "1", and "0". A value of "0" is selected by setting the selector 2107 to "1". The count value of the counter A and the value of "0" are input to the adder 2108, and thus the output of the adder 2108 is the A image. Note that when the selectors 2106 and 2107 are both set to "0", the adder 2105 and the adder 2108 add the count value of the counter 2104A and the count value of the counter 2104B, and output the A+B image.

Figure 24C:
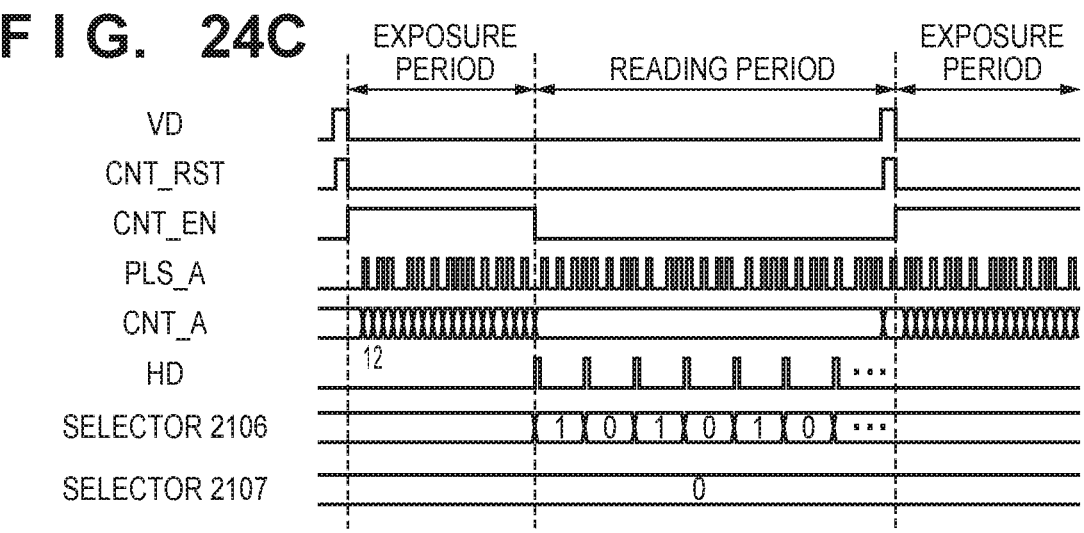

FIG. 24C illustrates a case where the selector 2106 repeats "1", "0", "1", and "0", which corresponds to the driving mode illustrated in FIG. 23C. Specifically, in FIG. 23C, the A image is thinned out and read out. By setting the selector 2106 to "1", the same color A images two lines apart in the vertical direction are selected. The count value of the counter 2104A and the count value of the counter 2104A for the same color two lines apart in the vertical direction are input to the adder 2105, and thus the output of the adder 2105 is an A+A image. The selector 2107 remains "0", and the count value of the counter 2104B is selected. The count value of the counter A and the count value of the counter B are input to the adder 2108, and thus the output of the adder 2108 is the A+B image.

In FIG. 24C, adjacent A images of the same color are added together, and thus the strength of the signal is approximately doubled. However, random noise is not doubled, and thus the S/N ratio is improved. Furthermore, in the first line, an A image to which the A image from the third line is added is read out, and in the second line, an A image to which the A image from the fourth line is added is read out, which means that even if the third and fourth lines have high-contrast signals, those signals are mixed with the A images from the first and second lines. In other words, missing objects, such as which occur when only low-contrast positions are read out, can be prevented from arising.

As described thus far, with the image capturing apparatus according to the present embodiment, the inputs to the adders within the unit pixels are switched by selectors in accordance with the driving mode of the image sensor 2503. As a result, only the minimum required focus detection pixels are read out, which makes it possible to lighten the load on the system while simultaneously improving the accuracy of focus detection.

Fifth Embodiment

Figure 25:
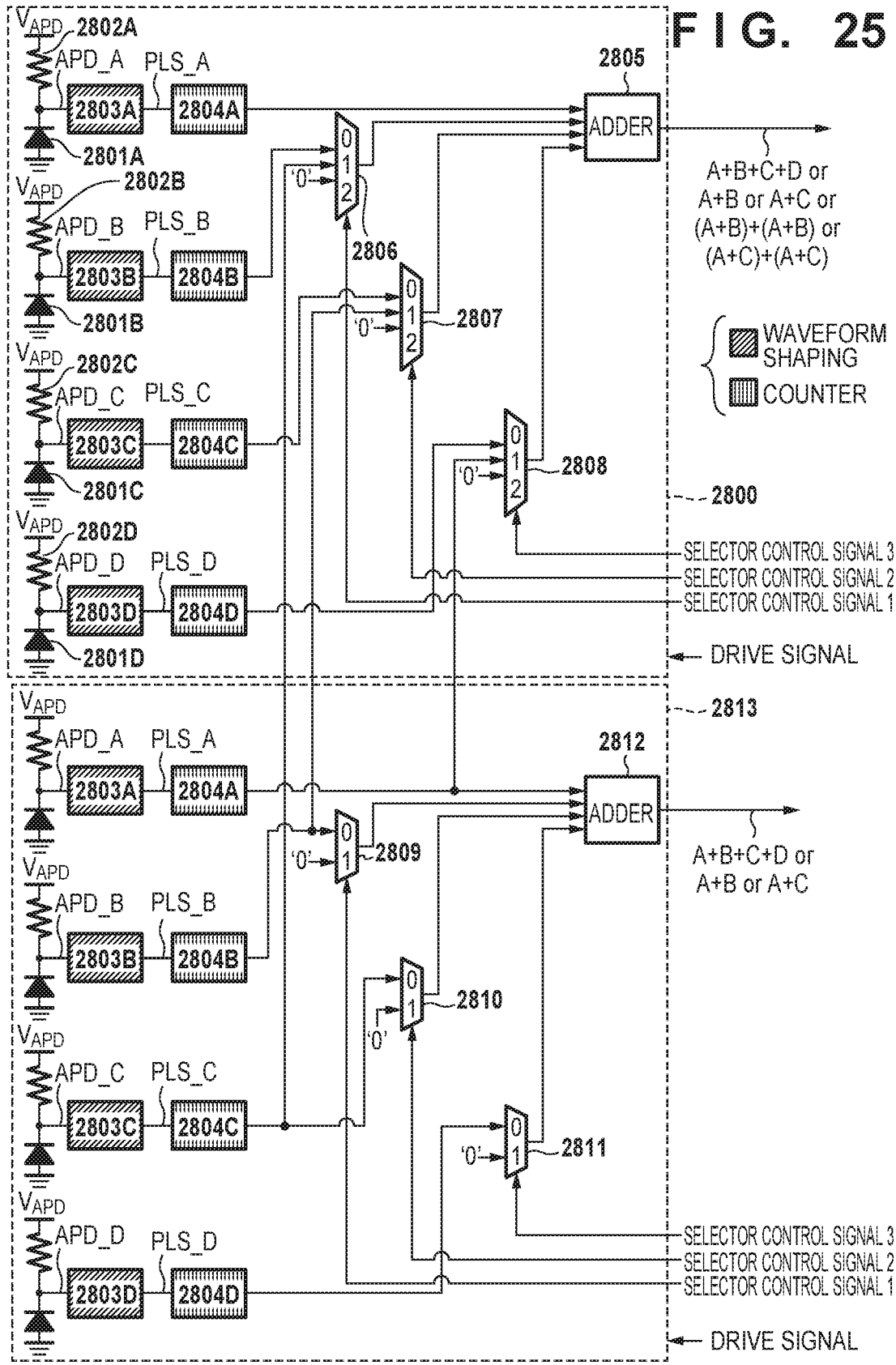
FIG. 25 is a diagram illustrating the configuration of a unit pixel according to a fifth embodiment.
Figure 26:
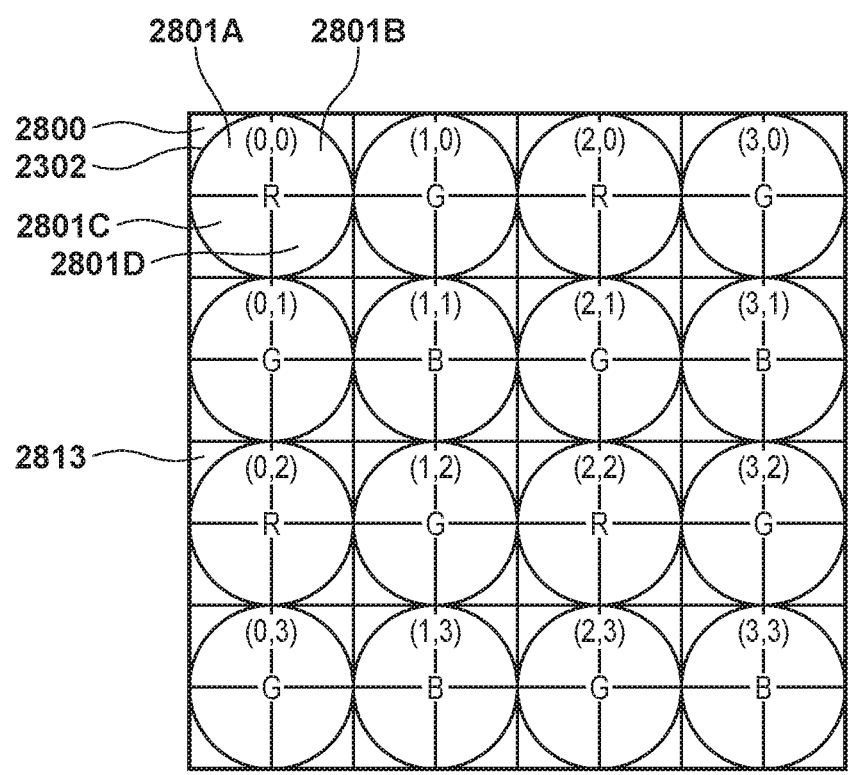
FIG. 26 is a top view of an image sensor according to the fifth embodiment.

FIG. 25 is a circuit diagram illustrating the configurations of unit pixels 2800 and 2813 according to a fifth embodiment of the present invention. As illustrated in FIG. 26, the unit pixels 2800 and 2813 each correspond to one pixel below microlenses 2302, which are arranged two-dimensionally. Furthermore, a single color filter is provided beneath each microlens 2302, forming a Bayer array in which the upper-left pixel is an R pixel. The unit pixel 2800 is the R pixel at the upper-left (0,0), and the unit pixel 2813 is the R pixel two pixels below the unit pixel 2800 (0,2). Each of the unit pixels 2800 and 2813 includes APDs 2801A, 2801B, 2801C, and 2801D and quenching resistors 2802A, 2802B, 2802C, and 2802D. Waveform shaping circuits 2803A, 2803B, 2803C, and 2803D, counters 2804A, 2804B, 2804C, and 2804D, and adders 2805 and 2812 that add four count values are also included. Furthermore, selectors 2806, 2807, 2808, 2809, 2810, and 2811 that select input signals for the adders 2805 and 2812 are also included.

Four of the APDs 2801 are provided in the unit pixels 2800 and 2813 as light-receiving elements, and the APDs 2801A, 2801B, 2801C, and 2801D receive light that has passed through the same microlens. Signals can therefore be obtained from different regions of the exit pupil. An image for capturing is generated by the adders 2805 and 2812 adding the signals from the four light-receiving elements. The APDs, the quenching resistors, the waveform shaping circuits, and the counters are the same as in the fourth embodiment and will therefore not be described here.

The selector 2806 selects one of three inputs in response to a control signal 1 input to the unit pixel 2800. When the control signal is "0", the count value of the counter 2804B is selected; when the control signal is "1", the count value of the counter 2804C in the unit pixel 2813 is selected; and when the control signal is "2", a value of "0" is selected.

The selector 2807 selects one of three inputs in response to a control signal 2 input to the unit pixel 2800. When the control signal is "0", the count value of the counter 2804C is selected; when the control signal is "1", the count value of the counter 2804B in the unit pixel 2813 is selected; and when the control signal is "2", a value of "0" is selected.

The selector 2808 selects one of three inputs in response to a control signal 3 input to the unit pixel 2800. When the control signal is "0", the count value of the counter 2804D is selected; when the control signal is "1", the count value of the counter 2804A in the unit pixel 2813 is selected; and when the control signal is "2", a value of "0" is selected.

The selector 2809 selects one of two inputs in response to the control signal 1 input to the unit pixel 2813. When the control signal is "0", the count value of the counter 2804B is selected; and when the control signal is "1", a value of "0" is selected.

The selector 2810 selects one of two inputs in response to the control signal 2 input to the unit pixel 2813. When the control signal is "0", the count value of the counter 2804C is selected; and when the control signal is "1", a value of "0" is selected.

The selector 2811 selects one of two inputs in response to the control signal 3 input to the unit pixel 2813. When the control signal is "0", the count value of the counter 2804D is selected; and when the control signal is "1", a value of "0" is selected.

Here, assumes that a control signal of "0" has been input to all of the selectors 2806 to 2811. In this case, the input of the adder 2805 is the count values of the counter 2804A, the counter 2804B, the counter 2804C, and the counter 2804D in the unit pixel 2800, and an A+B+C+D image is generated as a result of adding these values together. Likewise, the input of the adder 2812 is the count values of the counter 2804A, the counter 2804B, the counter 2804C, and the counter 2804B in the unit pixel 2813, and an A+B+C+D image is generated as a result of adding these values together. As described earlier, an image capturing pixel signal is generated by adding together all of the signals from the four light-receiving elements, and thus the A+B+C+D image is an image capturing pixel signal.

A situation where "2" is set for the selector 2806, "0" is set for the selector 2807, "2" is set for the selector 2808, "1" is set for the selector 2809, "0" is set for the selector 2810, and "1" is set for the selector 2811 will be described next. In this case, the input of the adder 2805 is the count values of only the counter 2804A and the counter 2804C in the unit pixel 2800, and an A+C image is generated as a result of adding these values together. Likewise, the input of the adder 2812 is the count values of the counter 2804A and the counter 2804C in the unit pixel 2813, and an A+C image is generated as a result of adding these values together.

The image capturing pixel signal (A+B+C+D image) output from the image sensor 2503, and the focus detection pixel signal (the A+C image), are input to the added signal dividing unit 2505. The focus detection pixel signal (the A+C image) is subtracted from the image capturing pixel signal (the A+B+C+D image) by the added signal dividing unit 2505 to generate another focus detection pixel signal (a B+D image). The two focus detection pixel signals (the A+C image and the B+D image) are input to the phase difference detecting unit 2507, and a phase difference evaluation value for carrying out phase difference detection is calculated from the two pupil-division images pupil-divided in the horizontal direction.

A situation where "0" is set for the selector 2806, "2" is set for the selector 2807, "2" is set for the selector 2808, "0" is set for the selector 2809, "1" is set for the selector 2810, and "1" is set for the selector 2811 will be described next. In this case, the input of the adder 2805 is the count values of only the counter 2804A and the counter 2804B in the unit pixel 2800, and an A+B image is generated as a result of adding these values together. Likewise, the input of the adder 2812 is the count values of the counter 2804A and the counter 2804B in the unit pixel 2813, and an A+B image is generated as a result of adding these values together.

The focus detection pixel signal (the A+B image) is subtracted from the image capturing pixel signal (the A+B+C+D image) by the added signal dividing unit 2505 to generate another focus detection pixel signal (a C+D image). The two focus detection pixel signals (the A+B image and the C+D image) are input to the phase difference detecting unit 2507, and a phase difference evaluation value for carrying out phase difference detection is calculated from the two pupil-division images pupil-divided in the vertical direction.

Furthermore, a situation where "1" is set for the selector 2806, "0" is set for the selector 2807, and "1" is set for the selector 2808 will be described next. In this case, the input of the adder 2805 is the count values of the counter 2804A and the counter 2804C of the unit pixel 2800, and the count values of the counter 2804A and the counter 2804C of the unit pixel 2813. The result of the adding is the (A+C image) from the unit pixel 2800 and the (A+C image) from the unit pixel 2813. By controlling the selectors in this manner, adjacent A+C images of the same color can be added together, which approximately doubles the signal strength, in the same manner as in the fourth embodiment. However, random noise is not doubled, and thus the S/N ratio is improved.

Furthermore, in the first line, an A+C image to which the A+C image from the third line is added is read out, and in the second line, an A+C image to which the A+C image from the fourth line is added is read out. Thus even if the third and fourth lines have high-contrast signals, those signals are mixed with the A+C images from the first and second lines. In other words, missing objects, such as which occur when only low-contrast positions are read out, can be prevented from arising.

Returning to FIG. 26, the structure of an image sensor according to the present embodiment will be described. In the present embodiment, the area below each of the individual microlenses 2302 which form a microlens array is defined as a single pixel, and these correspond to the unit pixels 2800 and 2813. Furthermore, a plurality of divided pixels are arranged so as to correspond to a single microlens 2302. Note that in the present embodiment, two divided pixels are arranged in the X-axis direction and two in the Y-axis direction in the unit pixels 2800 and 2813, and these correspond to the APDs 2801A, 2801B, 2801C, and 2801D, respectively.

Because one pixel is divided among the signals from four light-receiving elements, using the selectors to switch the inputs to the adders within the unit pixels in accordance with the driving mode of the image sensor 2503 makes it possible to detect phase differences in both the horizontal and vertical directions.

As described thus far, with the image capturing apparatus according to the present embodiment, the inputs to the adders within the unit pixels are switched by selectors in accordance with the driving mode of the image sensor 2503. As a result, only the minimum required focus detection pixels are read out, which makes it possible to lighten the load on the system while simultaneously improving the accuracy of focus detection.

Sixth Embodiment

Figure 27:
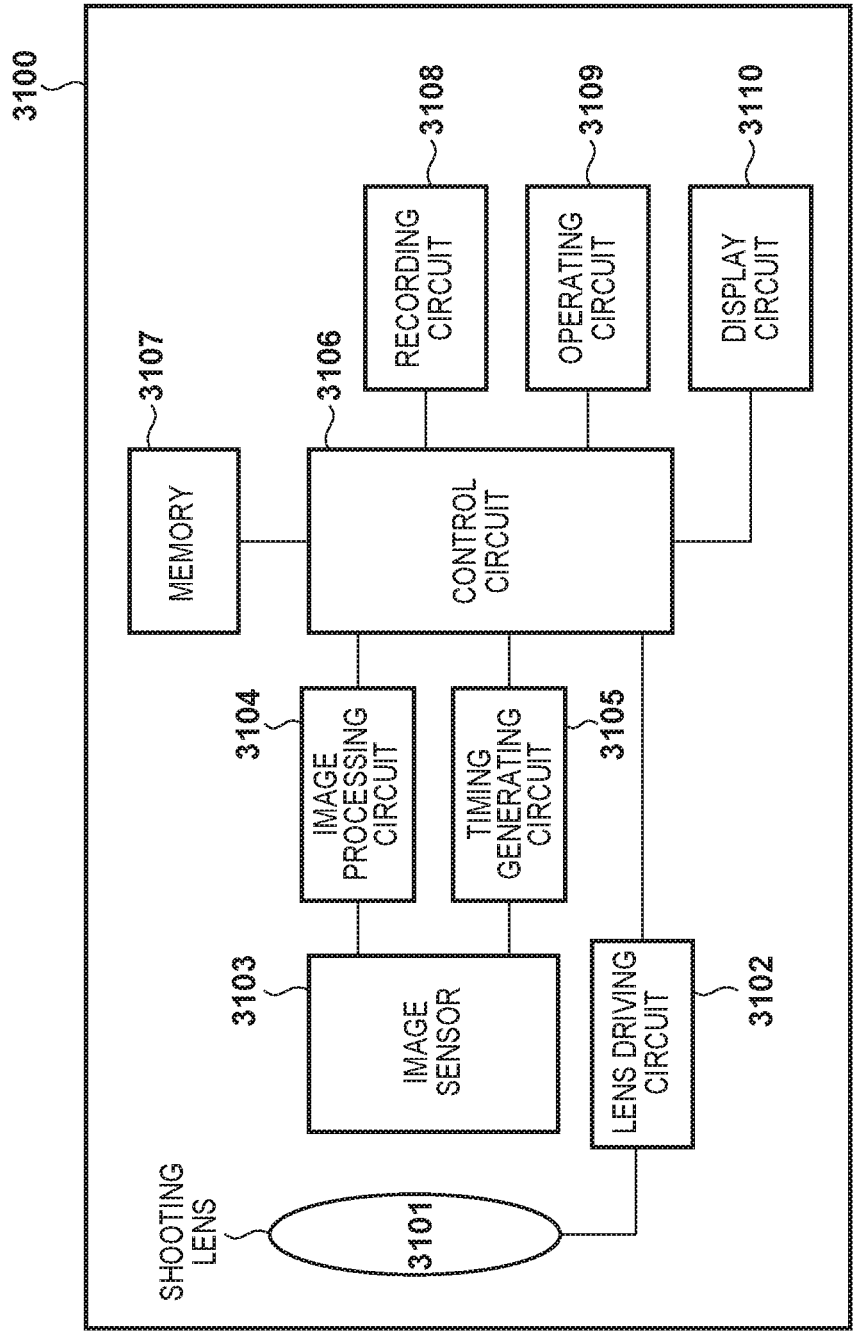
FIG. 27 is a diagram illustrating the configuration of an image capturing apparatus according to a sixth embodiment.

A sixth embodiment of the present invention will be described next. FIG. 27 is a block diagram illustrating the configuration of an image capturing apparatus 3100 according to a sixth embodiment of the present invention.

In FIG. 27, a lens unit 3101 forms an optical image of an object on an image sensor 3103. The lens unit 3101 is subjected to zoom control, focus control, aperture control, and the like by a lens driving circuit 3102. The image sensor 3103 photoelectrically converts the subject image formed by the lens unit 3101, and outputs an image signal. An image processing circuit 3104 carries out various types of correction processes, a development process, and the like on the image signal output from the image sensor 3103, and also carries out computations and the like for data compression. A timing generating circuit 3105 outputs various types of driving timing signals to drive the image sensor 3103. A control circuit 3106 carries out various types of computations to control and monitor the image capturing apparatus as a whole. Memory 3107 temporarily stores image data, and is also used as a work area for the control circuit 3106. A recording circuit 3108 is a circuit for recording into a removable recording medium such as semiconductor memory, or reading out from the recording medium. An operating circuit 3109 accepts commands from a user, and communicates those commands to the control circuit 3106. A display circuit 3110 displays various types of information, shot images, and the like.

Figure 28:
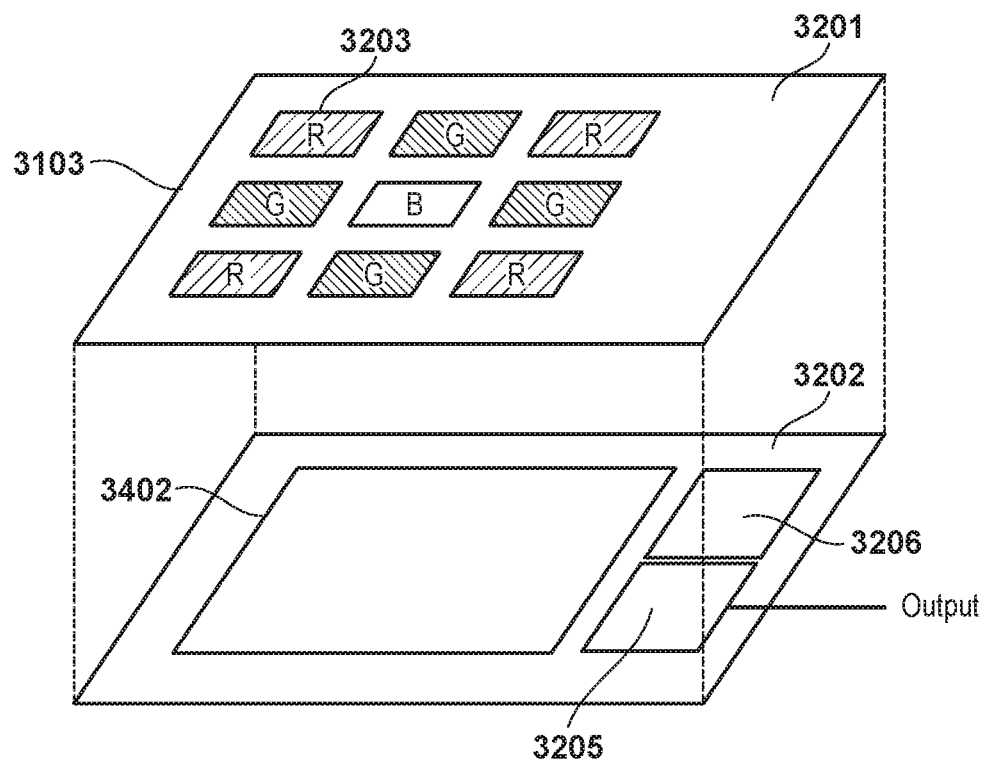
FIG. 28 is a diagram illustrating the configuration of an image sensor according to the sixth embodiment.

Next, FIG. 28 is a diagram illustrating the configuration of the image sensor 3103 according to the sixth embodiment. The image sensor 3103 has a layered structure including a sensor substrate 3201 and a circuit board 3202. However, the sensor may have a single-layer structure, instead of a layered structure, as long as the same functions are provided.

A pixel array, in which unit pixels 3203 are arranged in a matrix, is formed in the sensor substrate 3201. The unit pixels 3203 are provided with R (red), G (green), and B (blue) color filters for color separation. Microlenses (not shown) for improving the focusing efficiency of incident light are also provided. The circuit configuration of the unit pixel 3203 will be described in detail later.

The circuit board 3202 is configured including a counting unit 3402, a signal processing circuit 3205, and board memory 3206. The counting unit 3402 is electrically connected to each of the unit pixels in the sensor substrate 3201 by bumps or the like, and outputs control signals for driving the unit pixels 3203, as well as receiving buffer outputs from the pixels. For each corresponding unit pixel, the counting unit 3402 includes a comparator 3304, which determines the presence/absence of a photon using a given threshold Vth, as well as a counter 3305 (see FIG. 29), and measures the number of pulses output in response to incident photons. The count values measured by the counting unit 3402 are subjected to various types of computational processes, external output processes, and the like by the signal processing circuit 3205. The board memory 3206 is volatile memory such as DRAM, and is used for temporarily storing data and so on when the signals from the counting unit 3402 are processed by the signal processing circuit 3205.

Figure 29:
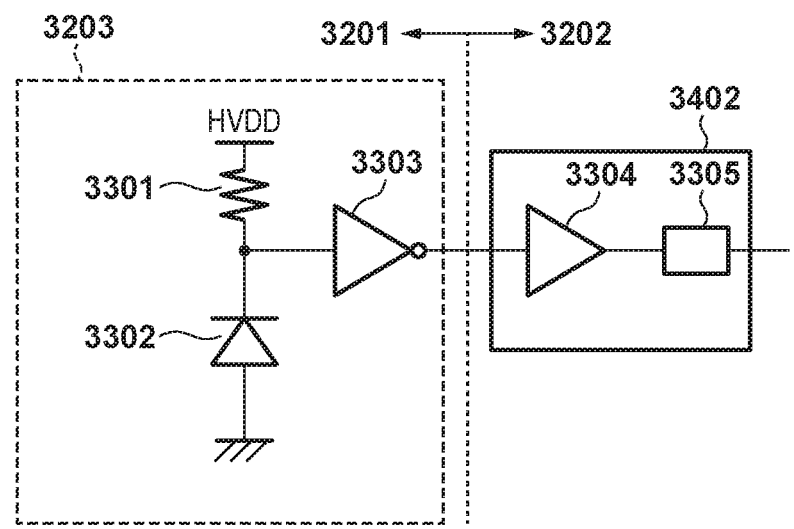
FIG. 29 is a diagram illustrating the configuration of a unit pixel according to the sixth embodiment.

FIG. 29 is an equivalent circuit diagram of the unit pixel 3203 formed in the sensor substrate 3201. Although the present embodiment will describe a configuration using avalanche photodiodes as an example, the configuration for implementing AD conversion in the unit pixels is not limited thereto.

The unit pixel 3203 is configured including a quenching resistor 3301, an avalanche photodiode ("APD" hereinafter) 3302, and a buffer 3303. A reverse-bias voltage from a voltage HVDD is applied to the APD 3302 via the quenching resistor. At this time, the voltage HVDD is set to be greater than or equal to a breakdown voltage for putting the APD into Geiger mode. The comparator 3304 within the counting unit 3402 compares the output of the buffer 3303 with a reference voltage, and the result of the comparison is input to the counter 3305.

Figure 30:
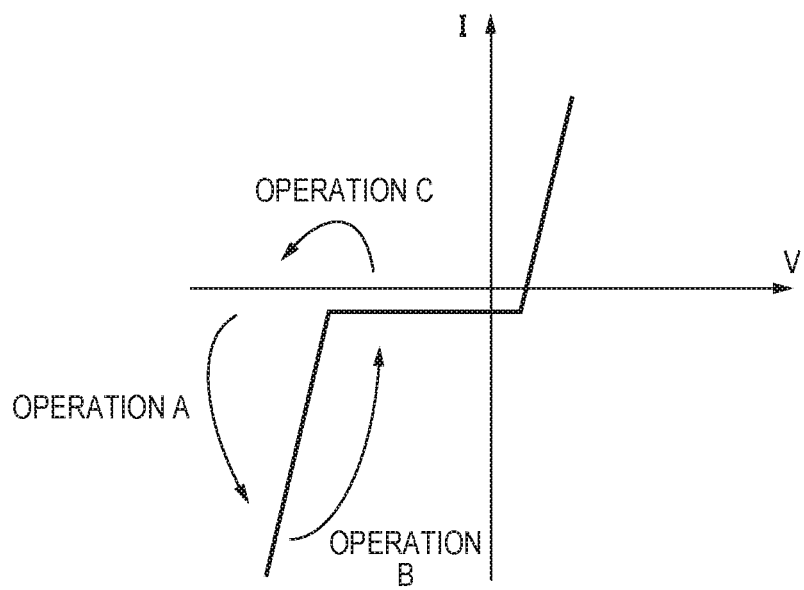
FIG. 30 is a schematic diagram illustrating Geiger mode transitions.

Operations of the unit pixel 3203 when a photon is incident will be described here using FIG. 30. FIG. 30 illustrates the current/voltage characteristics of the APD. In the present embodiment, the cathode of the APD 3302 is connected to the voltage HVDD, which exceeds the breakdown voltage, and thus the APD 3302 operates in Geiger mode. Here, when a photon is incident on APD 3302, a large current (photocurrent) flows in the APD 3302 due to avalanche amplification (operation A). When this current flows, a voltage drop arises in the quenching resistor 3301 at the same time; the voltage applied to the APD 3302 drops below the breakdown voltage, and the avalanche amplification stops (operation B). When the avalanche amplification stops, the cathode of the APD 3302 is once again charged by the voltage HVDD, and the APD 3302 returns to Geiger mode (operation C). A change in the voltage at the buffer input end caused by the operations A to C undergoes pulse shaping by the buffer 3303, and is measured by the comparator 3304 and the counter 3305. The number of photons incident on APD 3302 can be measured by repeating these operations.

Figure 31:
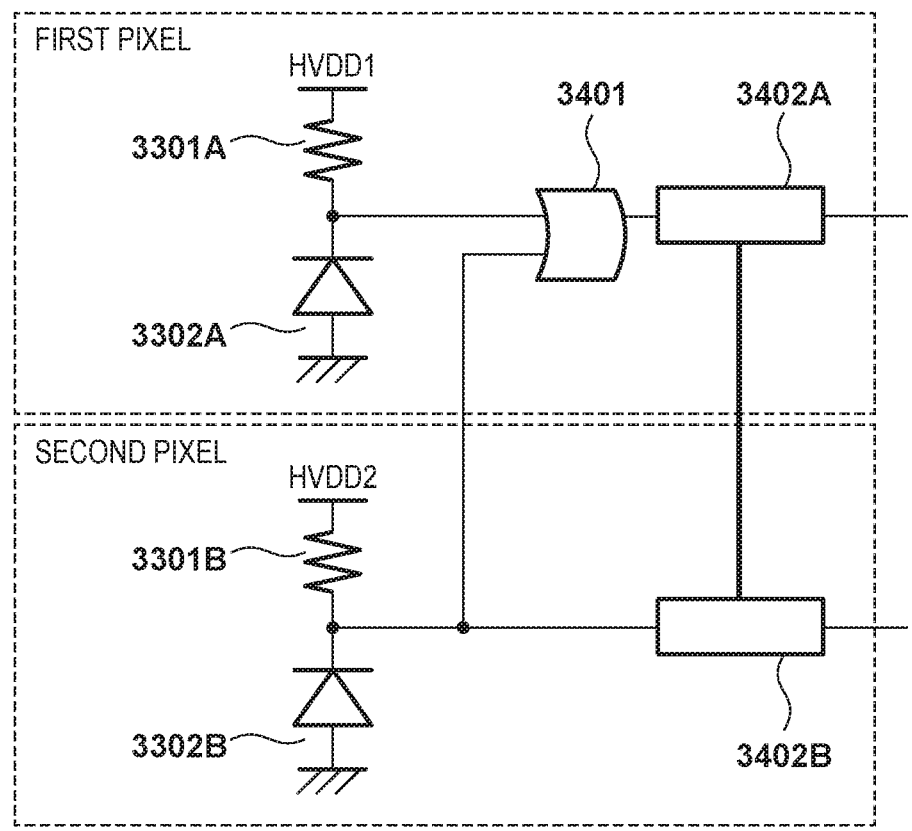
FIG. 31 is a diagram illustrating the configuration of the unit pixel according to the sixth embodiment.

FIG. 31 is a schematic diagram illustrating a circuit configuration according to the sixth embodiment. FIG. 31 illustrates a connection pattern achieved by a combination that mixes two it pixels 3203 of the same color in the Bayer-array sensor substrate 3201.

Here, quenching resistors 3301A and 3301B, and APDs 3302A and 3302B, are the same as in FIG. 29, and the buffer 3303 is not illustrated. A counting unit 3402A is a counting unit corresponding to a first pixel (a counter unit constituted by a comparator and a counter), and a counting unit 3402B is a counting unit corresponding to a second pixel. In addition to a signal from the first pixel, a signal from the second pixel is connected to the counting unit 3402A via an OR circuit 3401. Note also that the counting unit 3402A includes an N+1-bit (bit length) counter, while the counting unit 3402B includes an N-bit (bit length) counter. This is so that the counting unit 3402A counts two pixels' worth of signals. N is determined by the tones required for the image capturing apparatus, and is typically 14, 12, or the like, for example.

Figure 32A:
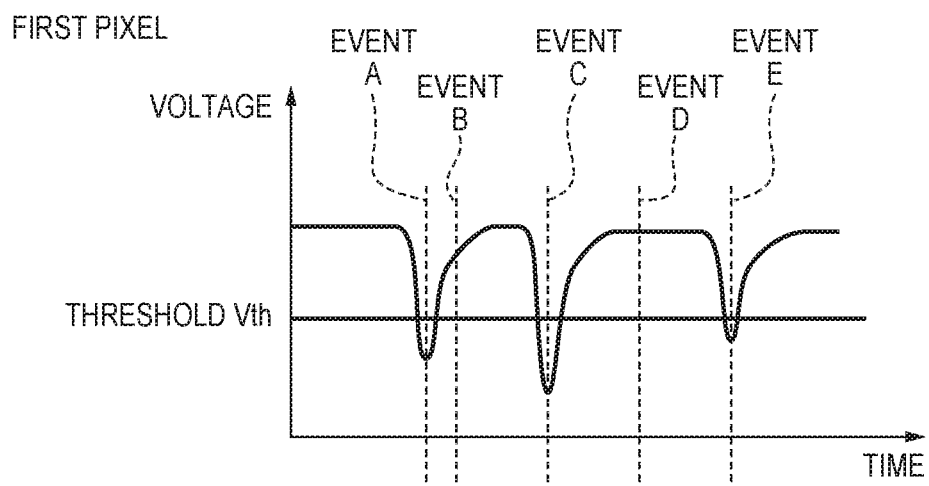
FIGS. 32A to 32C are schematic diagrams illustrating pulse waveforms and count numbers when photons are incident.
Figure 32B:
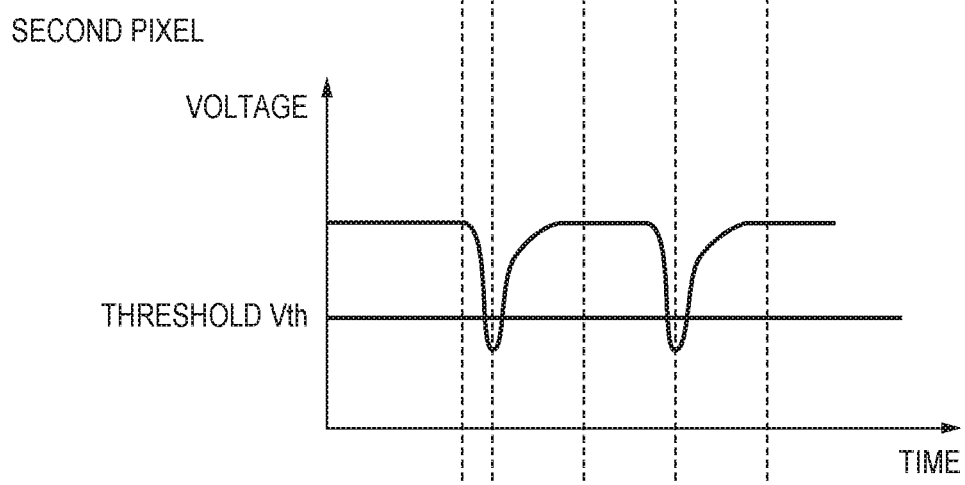
Figure 32C:
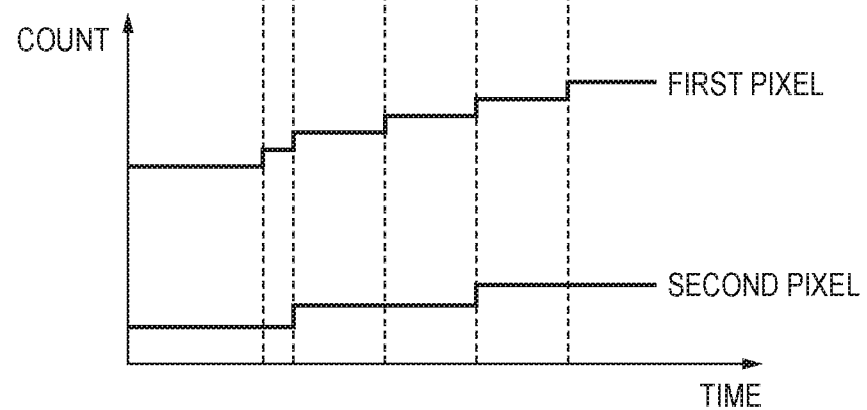

The relationships between the pulses output from the pixels and the counts will be described next using FIGS. 32A to 32C. FIGS. 32A to 32C are schematic diagrams illustrating the pulse waveforms occurring when photons are incident and the count numbers counted by the counting units 3402A and 3402B, with the horizontal axis representing time.

Here, FIG. 32A illustrates a case where photon events A, C, and E occur in the first pixel. FIG. 32B illustrates a case where photon events B and D occur in the second pixel. These events produce avalanche amplification to an extent at which pulses which exceed the threshold Vth of the comparators are output, and the pulses are assumed to be time-resolved.

First, in the first pixel, all the photon events A, C, and E from the first pixel and the photon events B and D from the second pixel are counted through an OR operation, and in this example, a count of 5 is output. On the other hand, in the second pixel, only the photon events B and D from the second pixel are counted, and in this example, a count of 2 is output.

The signal output of each pixel in this configuration is assumed to be expressed as follows. First, in the first pixel, all the photon events from the first pixel and the photon events from the second pixel are counted through an OR operation. The count at this time is taken as A+B. On the other hand, in the second pixel, only the photon events from the second pixel are counted. The count at this time is taken as B. Thus in the present embodiment, by counting the pulses of another pixel via an OR circuit, pixel mixing (A+B) is expressed by the first pixel. Furthermore, if the aim is only to obtain a pixel mixing output, it is sufficient to carry out the counting operation using only the counting unit 3402A, and thus setting the counting unit 3402B to inoperative (stopped; power-saving) makes it possible to reduce the power consumed.

Here, consider a case where pixels are mixed using normal N-bit pixels, as opposed to the format used in the present embodiment. In this case, the pixels are mixed by outputting both the first pixel (N bits) and the second pixel (N bits), and it is thus necessary to transfer data equivalent to N+N, i.e., 2N, bits. On the other hand, in the present embodiment, the desired signal is obtained with N+1 bits, which also makes it possible to reduce the amount of data transferred.

Note that by operating the counting unit 3402B along with the counting unit 3402A and subtracting the second pixel count (B) from the first pixel count (A+B), a first pixel count without pixel mixing (A+B−B=A) can also be calculated. In the image capturing apparatus, the above-described pixel mixing output (pixel mixing mode) is used mainly in a moving image mode, and signal output without pixel mixing (a non-pixel mixing mode) is used mainly in a still image mode.

The present embodiment can furthermore be applied in what is known as a complex pixel structure, in which the first pixel and the second pixel share a single microlens. This deviates from the main topic of the present invention and will therefore not be described in detail, but a complex pixel structure is a structure for realizing image capturing-plane phase difference AF. For example, the above-described pixel mixing output is applied in a normal shooting mode in which image capturing-plane phase difference AF is not carried out. The above-described signal output without pixel mixing can be read out having separated the signals from each pupil-divided pixel, and is therefore used mainly in an AF mode (a focus detection image readout mode).

According to the present embodiment as described thus far, in a configuration that carries out AD conversion in pixel units, pixel mixing can be realized while improving the data transfer efficiency and suppressing power consumption.

Variation on Sixth Embodiment

Figure 33:
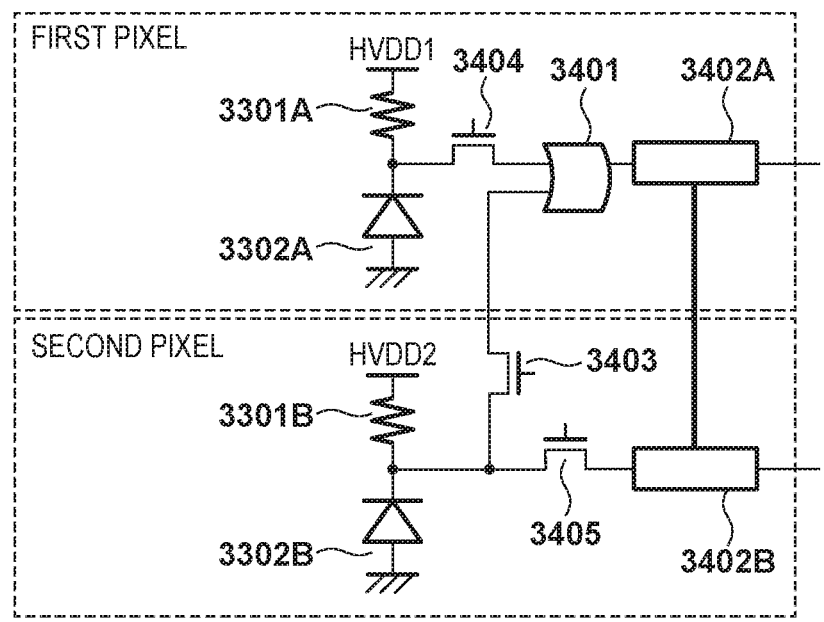
FIG. 33 is a diagram illustrating the configuration of a unit pixel according to a variation on the sixth embodiment.

FIG. 33 illustrates a variation on the sixth embodiment. FIG. 33 illustrates a connection pattern achieved by a combination that mixes two unit pixels 3203 of the same color in the Bayer-array sensor substrate 3201.

The difference from FIG. 31 referred to in the sixth embodiment is that disconnecting switches 3404 and 3403 are provided between the APDs 3302A and 3302B, respectively, and the OR circuit 3401, and a disconnecting switch 3405 is provided between the APD 3302B and the counting unit 3402B.

In this configuration, turning the disconnecting switch 3403 off makes it possible to read out signals normally, without pixel mixing. Furthermore, by turning the disconnecting switch 3405 off, the counter in the counting unit 3402B (N bits) is connected to the counter in the counting unit 3402A (N+1 bits). Connecting the counter in the counting unit 3402A and the counter in the counting unit 3402B to function as a single counter (with a total bit number of 2N+1 bits) makes it possible to broaden the dynamic range (AD saturation) of the image sensor.

Seventh Embodiment

Figure 34:
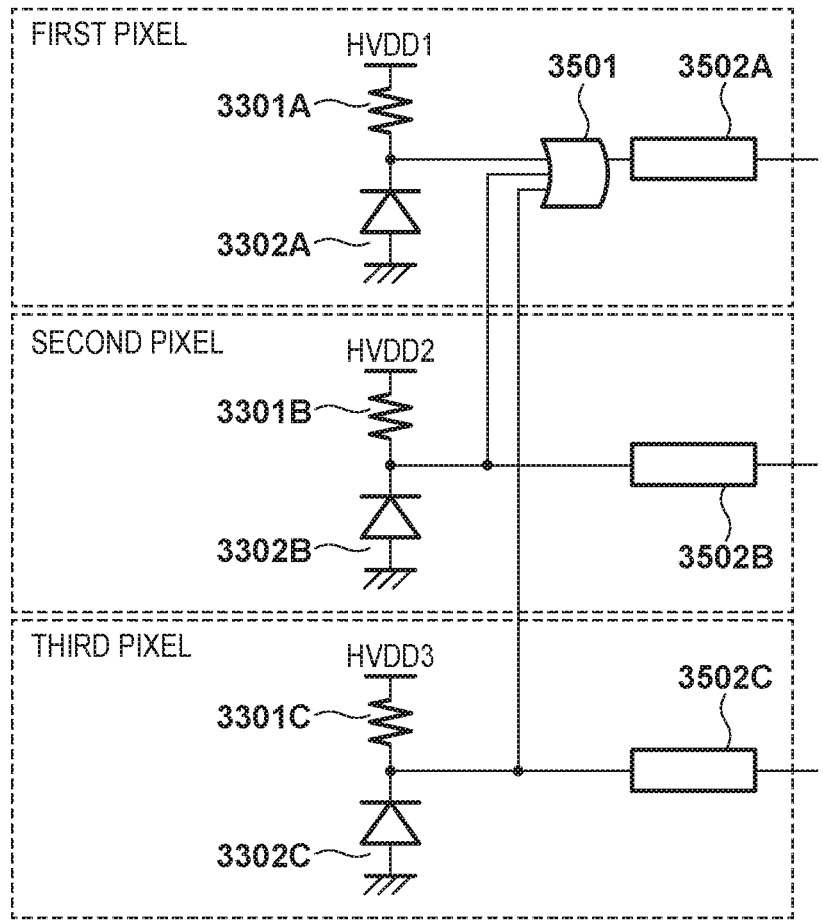
FIG. 34 is a diagram illustrating the configuration of a unit pixel according to a seventh embodiment.

FIG. 34 is a schematic diagram illustrating a circuit configuration according to a seventh embodiment of the present invention. FIG. 34 illustrates a connection pattern achieved by a combination that mixes three unit pixels 3203 of the same color in the Bayer-array sensor substrate 3201.

A counting unit 3502A is a counting unit corresponding to the first pixel (a comparator and a counter), and counting units 35023 and 3502C are counting units corresponding to second and third pixels, respectively. In addition to a signal from the first pixel, signals from the second and third pixels are connected to the counting unit 3502A via an OR circuit 3501. Note that the counting unit 3502A includes an N+2 bit counter. The counting units 3502B and 3502C include N bit counters. This is so that the counting unit 3502A counts three pixels' worth of signals.

The signal output of each pixel in this configuration is assumed to be expressed as follows. First, in the first pixel, all the photon events from the first pixel and the photon events from the second and third pixels are counted through an OR operation. The count at this time is taken as A+B+C.

On the other hand, in the second pixel, only the photon events from the second pixel are counted. The count at this time is taken as B. Likewise, the count from the third pixel is taken as C. Thus in the present embodiment, by counting the pulses of other pixels via an OR circuit, pixel mixing (A+B+C) is expressed by the first pixel. Furthermore, if the aim is only to obtain a pixel mixing output, it is sufficient to carry out the counting operation using only the counting unit 3502A, and thus setting the counting units 3502B and 3502C to inoperative (stopped; power-saving) makes it possible to reduce the power consumed.

Here, consider a case where pixels are mixed using normal N-bit pixels, as opposed to the format used in the present embodiment. In this case, the pixels are mixed by outputting all of the first pixel (N bits) and the second and third pixels (N bits), and it is thus necessary to transfer data equivalent to N+N+N, i.e., 3N, bits. On the other hand, in the present embodiment, the desired signal is obtained with N+2 bits, which also makes it possible to reduce the amount of data transferred.

Note that by operating by operating the counting units 3502B and 3502C along with the counting unit 3502A and subtracting the second and third pixel counts (B, C) from the first pixel count (A+B+C), a first pixel count without pixel mixing (A+B+C−B−C=A) can also be calculated.

Furthermore, by operating the counting unit 3502B, which is the center of the mixing, along with the counting unit 3502A, and adding the first pixel count (A+B+C) to the second pixel count (B), a weighted pixel mixing signal (A+B+C+B=A+2B+C) can be calculated as well. In this case, the power consumed by the counting unit 3502C, and the data transfer amount, can be reduced as compared to generating a weighted pixel mixing signal after outputting the signals from all of the first to third pixels.

As another method for weighted adding, a method may be used in which HVDD for the second pixel, which is the center of the mixing, is set to be higher than HVDD for the first and third pixels to increase the likelihood of detecting photons. Additionally, a configuration may be used in which the logical threshold of the OR circuit 3501, the determination thresholds in the comparators within the counting units, or the like are made variable between the second pixel and the first and third pixels.

According to the seventh embodiment as described thus far, in a configuration that carries out AD conversion in pixel units, pixel mixing can be realized while improving the data transfer efficiency and suppressing power consumption.

Eighth Embodiment

Figure 35:
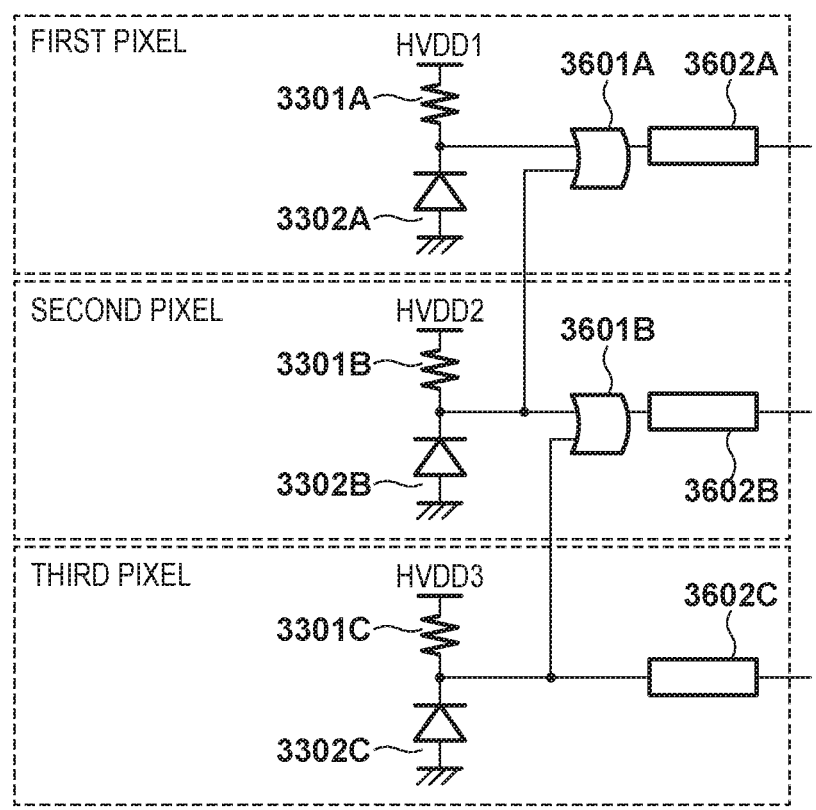
FIG. 35 is a diagram illustrating the configuration of a unit pixel according to an eighth embodiment.

FIG. 35 is a diagram illustrating the circuit configuration of an image sensor according to an eighth embodiment. FIG. 35 illustrates a connection pattern achieved by a combination that mixes two or three unit pixels 3203 of the same color in the Bayer-array sensor substrate 3201.

A counting unit 3602A is a counting unit corresponding to the first pixel (a comparator and a counter), and counting units 3602B and 3602C are counting units corresponding to second and third pixels, respectively. In addition to a signal from the first pixel, a signal from the second pixel is connected to the counting unit 3602A via an OR circuit 3601A. In addition to a signal from the second pixel, a signal from the third pixel is connected to the counting unit 3602B via an OR circuit 3601B. Note that the counting units 3602A and 3602B include an N+1 bit counter. Meanwhile, the counting unit 3602C includes an N bit counter. This is so that the counting units 3602A and 3602B count two pixels' worth of signals.

The signal output of each pixel in this configuration is assumed to be expressed as follows. First, in the first pixel, all the photon events from the first pixel and the photon events from the second pixel are counted through an OR operation. The count at this time is taken as A+B. On the other hand, in the second pixel, all the photon events from the second pixel and the photon events from the third pixel are counted through an OR operation. The count at this time is taken as B+C. On the other hand, in the third pixel, only the photon events from the third pixel are counted. The count at this time is taken as C.

Thus in the present embodiment, by counting the pulses of other pixels via an OR circuit, pixel mixing (A+B or B+C) is expressed by the first or second pixel. Furthermore, if the aim is only to obtain a pixel mixing output (A+B), it is sufficient to carry out the counting operation using only the counting unit 3602A, and thus setting the counting units 3602B and 3602C to inoperative (stopped; power-saving) makes it possible to reduce the power consumed. If the aim is only to obtain a pixel mixing output (B+C), it is sufficient to carry out the counting operation using only the counting unit 3602B, and thus setting the counting units 3602A and 3602C to inoperative (stopped; power-saving) makes it possible to reduce the power consumed.

Note that by operating the counting units 3602B and 3602C along with the counting unit 3602A and subtracting the third pixel count (C) from the second pixel count (B+C), a second pixel count without pixel mixing (B+C−C=B) can also be calculated. A first pixel count without mixing (A+B−B=A) can furthermore be calculated after that.

Furthermore, by operating the counting unit 3602B, which is the center of the mixing, along with the counting unit 3602A, and adding the first pixel count (A+B) to the second pixel count (B+C), a weighted pixel mixing signal (A+B+B+C=A+2B+C) can be calculated as well. In this case, the power consumed by the counting unit 3602C, and the data transfer amount, can be reduced as compared to generating a weighted pixel mixing signal after outputting the signals from all of the first to third pixels.

Here, consider a case where pixels are mixed using normal N-bit pixels, as opposed to the format used in the present embodiment. In this case, the pixels are mixed by outputting all of the first and second pixels (N bits) and the third pixel (N bits), and it is thus necessary to transfer data equivalent to N+N+N, i.e., 3N, bits. On the other hand, in the present embodiment, the desired signal is obtained with N+1 bits for the pixel mixing output (A+B) or the pixel mixing output (B+C), and with N+1+N+1=2N+2 bits for the pixel mixing output (A+2B+C), which also makes it possible to reduce the data transfer amount.

According to the eighth embodiment as described thus far, in a configuration that carries out AD conversion in pixel units, pixel mixing can be realized while improving the data transfer efficiency and suppressing power consumption.

Ninth Embodiment

Figure 36:
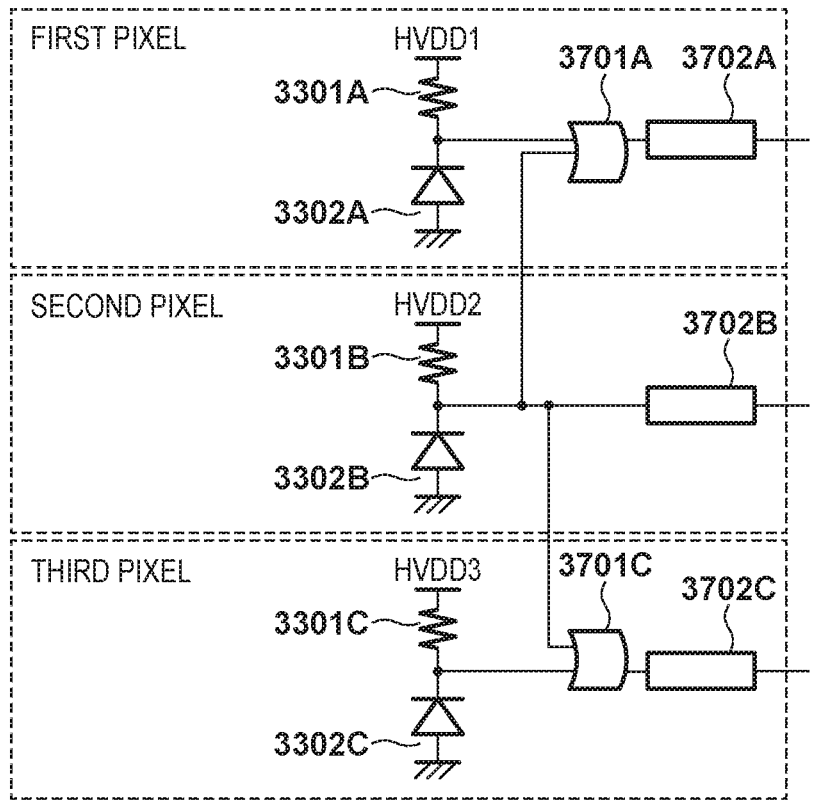
FIG. 36 is a diagram illustrating the configuration of a unit pixel according to a ninth embodiment.

FIG. 36 is a diagram illustrating the circuit configuration of an image sensor according to a ninth embodiment of the present invention. FIG. 36 illustrates a connection pattern achieved by a combination that mixes two or three unit pixels 3203 of the same color in the Bayer-array sensor substrate 3201.

A counting unit 3702A is a counting unit corresponding to the first pixel (a comparator and a counter), and counting units 3702B and 3702C are counting units corresponding to second and third pixels, respectively. In addition to a signal from the first pixel, a signal from the second pixel is connected to the counting unit 3702A via an OR circuit 3701A. In addition to a signal from the third pixel, a signal from the second pixel is connected to the counting unit 3702C via an OR circuit 3701C. Note that the counting units 3702A and 3702C include an N+1 bit counter. The counting unit 3702B includes an N bit counter. This is so that the counting units 3702A and 3702C count two pixels' worth of signals.

The signal output of each pixel in this configuration is assumed to be expressed as follows. First, in the first pixel, all the photon events from the first pixel and the photon events from the second pixel are counted through an OR operation. The count at this time is taken as A+B. In the second pixel, only the photon events from the second pixel are counted. The count at this time is taken as B. Furthermore, in the third pixel, all the photon events from the third pixel and the photon events from the second pixel are counted through an OR operation. The count at this time is taken as B+C.

Thus in the present embodiment, by counting the pulses of other pixels via an OR circuit, pixel mixing (A+B or B+C) is expressed by the first or third pixel. Furthermore, if the aim is only to obtain a pixel mixing output (A+B), it is sufficient to carry out the counting operation using only the counting unit 3702A, and thus setting the counting units 3702B and 3702C to inoperative (stopped; power-saving) makes it possible to reduce the power consumed. If the aim is only to obtain a pixel mixing output (B+C), it is sufficient to carry out the counting operation using only the counting unit 3702C, and thus setting the counting units 3702A and 3702B to inoperative (stopped; power-saving) makes it possible to reduce the power consumed.

Note that by operating the counting units 3702B and 3702C along with the counting unit 3702A and subtracting the second pixel count (B) from the first pixel count (A+B), a first pixel count without pixel mixing (A+B−B=A) can also be calculated. Likewise, a third pixel count without pixel mixing (B+C−B=C) can be calculated as well. Furthermore, by operating the counting unit 3702C along with the counting unit 3702A, and adding the first pixel count (A+B) to the third pixel count (B+C), a weighted pixel mixing signal (A+B+B+C=A+2B+C) can be calculated as well. In this case, the power consumed by the counting unit 3702B, and the data transfer amount, can be reduced as compared to generating a weighted pixel mixing signal after outputting the signals from all of the first to third pixels.

Here, consider a case where pixels are mixed using normal N-bit pixels, as opposed to the format used in the present embodiment. In this case, the pixels are mixed by outputting all of the first and third pixels (N bits each) and the second pixel (N bits), and it is thus necessary to transfer data equivalent to N+N+N, i.e., 3N, bits. On the other hand, in the present embodiment, the desired signal is obtained with N+1 bits for the pixel mixing output (A+B) or the pixel mixing output (B+C), and with N+1+N+1=2N+2 bits for the pixel mixing output (A+2B+C), which also makes it possible to reduce the data transfer amount.

According to the ninth embodiment as described thus far, in a configuration that carries out AD conversion in pixel units, pixel mixing can be realized while improving the data transfer efficiency and suppressing power consumption.

Tenth Embodiment

FIG. 37 is a schematic diagram illustrating a method for supplying the voltage HVDD according to a tenth embodiment of the present invention. FIG. 37 illustrates changes in HVDD1, supplied to the first pixel, and HVDD2, supplied to the second pixel, in the sixth embodiment, per unit accumulation time.

In this example, a single unit accumulation time is taken as Tv=$\frac{1}{128}$s, and the number of photons incident on the APDs 3302A and 3302B during this time is counted. For example, when outputting a moving image at a framerate of 120 fps, readout is continued in sequence while taking this accumulation time as a maximum accumulation time. The accumulation time is determined as desired within the range of the maximum accumulation time.

Incidentally, an issue with the sixth embodiment is that when photons are incident on the APDs 3302A and 3302B at the same time, the counting unit 3402A cannot separate the resulting pulses, and the two counts can only e counted as one.

To solve this issue, in the present embodiment, a Gated Geiger Mode (GGM) method, in which a reverse-bias voltage greater than or equal to the breakdown voltage is applied to the APD in pulses, is applied to the APDs 3302A and 3302B, shifted by half a phase. The GGM method is a technique in which a reverse bias voltage is AC-modulated into a binary value with an applied gate period of, for example, 10 ns and an amplitude of 1 V or more, and a pulse is time-resolved. The reverse-bias voltage is greater than or equal to the breakdown voltage at its highest and less than or equal to the breakdown voltage at its lowest.

If HVDD is greater than or equal to the breakdown voltage, a countable pulse is not output even when a photon is incident, and thus the times when the APDs 3302A and 3302B are capable of counting can be defined through voltage modulation. Thus by applying the GGM method to each pixel while shifting the phase makes it possible to measure the first and second pixels exclusively, in addition to time-resolving the incident photons.

Note that the configuration for shifting the phases of the first and second pixels is not limited to HVDD gating, and the configuration may be such that a time difference is provided by switching the disconnecting switches 3404 and 3405 on and off, providing an enabling circuit, or the like.

Additionally, although the foregoing embodiments describe mixing two and three pixels, the present invention is not limited to mixing two or three pixels.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-018255, filed Feb. 4, 2019 which is hereby incorporated by reference herein in its entirety.

What is claimed is:

1. An image capturing apparatus comprising:
a plurality of unit pixels each including one microlens and a plurality of avalanche photodiodes that produce pulse signals when light is incident on the avalanche photodiodes, a counting circuit that includes a first counter that counts the pulse signals from all of the plurality of avalanche photodiodes and a second counter that counts the pulse signals from some of the plurality of avalanche photodiodes, and
a subtracting circuit that subtracts a count value of the second counter from a count value of the first counter.

2. The image capturing apparatus according to claim 1, further comprising:
an image generating circuit that generates an image for recording and display from the count value obtained by the counting by the first counter.

3. The image capturing apparatus according to claim 1, further comprising:
a focus detection circuit that carries out focus detection using the count value obtained by the counting by the second counter and the count value obtained by the subtracting circuit.

4. The image capturing apparatus according to claim 1, wherein the unit pixel includes two avalanche photodiodes;
the first counter counts the pulse signals from the two avalanche photodiodes; and
the second counter counts the pulse signal from one of the two avalanche photodiodes.

5. The image capturing apparatus according to claim 1, wherein the unit pixel includes four avalanche photodiodes;
the first counter counts the pulse signals from the four avalanche photodiodes; and
the second counter counts the pulse signal from two of the four avalanche photodiodes.

6. The image capturing apparatus according to claim 1, wherein the second counter is provided only in a unit pixel located in a region where focus detection is carried out.

7. The image capturing apparatus according to claim 1, wherein the apparatus has a first mode, in which signals are output from both the first counter and the second counter, and a second mode, in which signals are output from only the first counter.

8. The image capturing apparatus according to claim 1, further comprising:
a signal processing circuit that adds the output signal from the first counter and the output signal from the second counter.

* * * * *